(12) United States Patent
Park et al.

(10) Patent No.: US 9,877,020 B2
(45) Date of Patent: Jan. 23, 2018

(54) METHOD FOR ENCODING INTER-LAYER VIDEO FOR COMPENSATING LUMINANCE DIFFERENCE AND DEVICE THEREFOR, AND METHOD FOR DECODING VIDEO AND DEVICE THEREFOR

(71) Applicant: SAMSUNG ELECTRONICS CO., LTD., Suwon-si (KR)

(72) Inventors: Min-woo Park, Hwaseong-si (KR); Jae-won Yoon, Seoul (KR); Byeong-doo Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 183 days.

(21) Appl. No.: 14/760,264

(22) PCT Filed: Jan. 10, 2014

(86) PCT No.: PCT/KR2014/000314
§ 371 (c)(1),
(2) Date: Jul. 10, 2015

(87) PCT Pub. No.: WO2014/109594
PCT Pub. Date: Jul. 17, 2014

(65) Prior Publication Data
US 2015/0350642 A1 Dec. 3, 2015

Related U.S. Application Data

(60) Provisional application No. 61/750,966, filed on Jan. 10, 2013.

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/117* (2014.11); *H04N 19/122* (2014.11);
(Continued)

(58) Field of Classification Search
CPC ..................................................... H04N 19/105
See application file for complete search history.

(56) References Cited

U.S. PATENT DOCUMENTS 7,813,428 B2 10/2010 Yoon et al.
8,548,039 B2 10/2013 Hayase et al.
(Continued)

FOREIGN PATENT DOCUMENTS

JP 2007329678 A 12/2007
KR 1020060105408 A 10/2006
(Continued)

OTHER PUBLICATIONS

Communication dated Apr. 29, 2014, issued by the International Searching Authority in counterpart International Application No. PCT/KR2014/000314.
(Continued)

*Primary Examiner* — Tracy Y Li
(74) *Attorney, Agent, or Firm* — Sughrue Mion, PLLC

(57) ABSTRACT

Provided are an inter-layer video encoding method and apparatus therefor and an inter-layer video decoding method and apparatus therefor. An inter-layer video decoding method involves reconstructing a first layer image, based on encoding information obtained from a first layer bitstream; in order to reconstruct a second layer block determined as a predetermined partition type and to be in a prediction mode, determining whether to perform illumination compensation for the reconstructed second layer block determined by using a first layer reference block that is from among the reconstructed first layer image and corresponds to the sec-
(Continued)

ond layer block; and generating the reconstructed second layer block by using inter-layer prediction information obtained from a second layer bitstream and the first layer reference block, and generating a second layer image including the reconstructed second layer block whose illumination is determined according to whether the illumination compensation was performed.

12 Claims, 27 Drawing Sheets

(51) Int. Cl.
| | |
|---|---|
| *H04N 19/122* | (2014.01) |
| *H04N 19/186* | (2014.01) |
| *H04N 19/503* | (2014.01) |
| *H04N 19/176* | (2014.01) |
| *H04N 19/136* | (2014.01) |
| *H04N 19/187* | (2014.01) |
| *H04N 19/159* | (2014.01) |
| *H04N 19/117* | (2014.01) |
| *H04N 19/33* | (2014.01) |
| *H04N 19/59* | (2014.01) |
| *H04N 19/82* | (2014.01) |
| *H04N 19/86* | (2014.01) |

(52) U.S. Cl.
CPC ......... *H04N 19/136* (2014.11); *H04N 19/159* (2014.11); *H04N 19/176* (2014.11); *H04N 19/186* (2014.11); *H04N 19/187* (2014.11); *H04N 19/33* (2014.11); *H04N 19/503* (2014.11); *H04N 19/59* (2014.11); *H04N 19/82* (2014.11); *H04N 19/86* (2014.11)

(56) References Cited

U.S. PATENT DOCUMENTS

| | | | |
|---|---|---|---|
| 9,288,486 | B2 | 3/2016 | Park et al. |
| 2002/0135743 | A1* | 9/2002 | Gindele .................. G06T 5/008 355/18 |
| 2008/0304760 | A1 | 12/2008 | Lee et al. |
| 2010/0215095 | A1* | 8/2010 | Hayase ................ H04N 19/105 375/240.02 |
| 2010/0272188 | A1 | 10/2010 | Park et al. |
| 2011/0122944 | A1* | 5/2011 | Gupta .................. H04N 19/176 375/240.12 |
| 2012/0163473 | A1* | 6/2012 | Laroche ............... H04N 19/105 375/240.24 |
| 2013/0182779 | A1 | 7/2013 | Lim et al. |
| 2014/0348232 | A1* | 11/2014 | Leontaris ............. H04N 19/597 375/240.12 |

FOREIGN PATENT DOCUMENTS

| | | |
|---|---|---|
| KR | 1020070014956 A | 2/2007 |
| KR | 100913104 B1 | 8/2009 |
| WO | 2012044093 A2 | 4/2012 |

OTHER PUBLICATIONS

Communication dated Sep. 27, 2017, issued by the State Intellectual Property Office of P.R. China in counterpart Chinese Application No. 201480013688.5.

* cited by examiner

FIG. 5

```
55
coding_unit(x0, y0, log2CbSize, ctDepth) {
    ...
    if(slice_type != I &&!MotionInhFlag[x0][y0])
        skip_flag[x0][y0]
    if(skip_flag[x0]y0])
        prediction_unit(x0, y0, log2CbSize)
    else {
        ...
    }
56 { if (icEnableFlag && PartMode = = PART_2Nx2N &&merge_flag[x0][y0]  ||
        skip_flag[x0][y0])
            ic_flag
    if (resPredEnableFlag)
        res_pred_flag
```

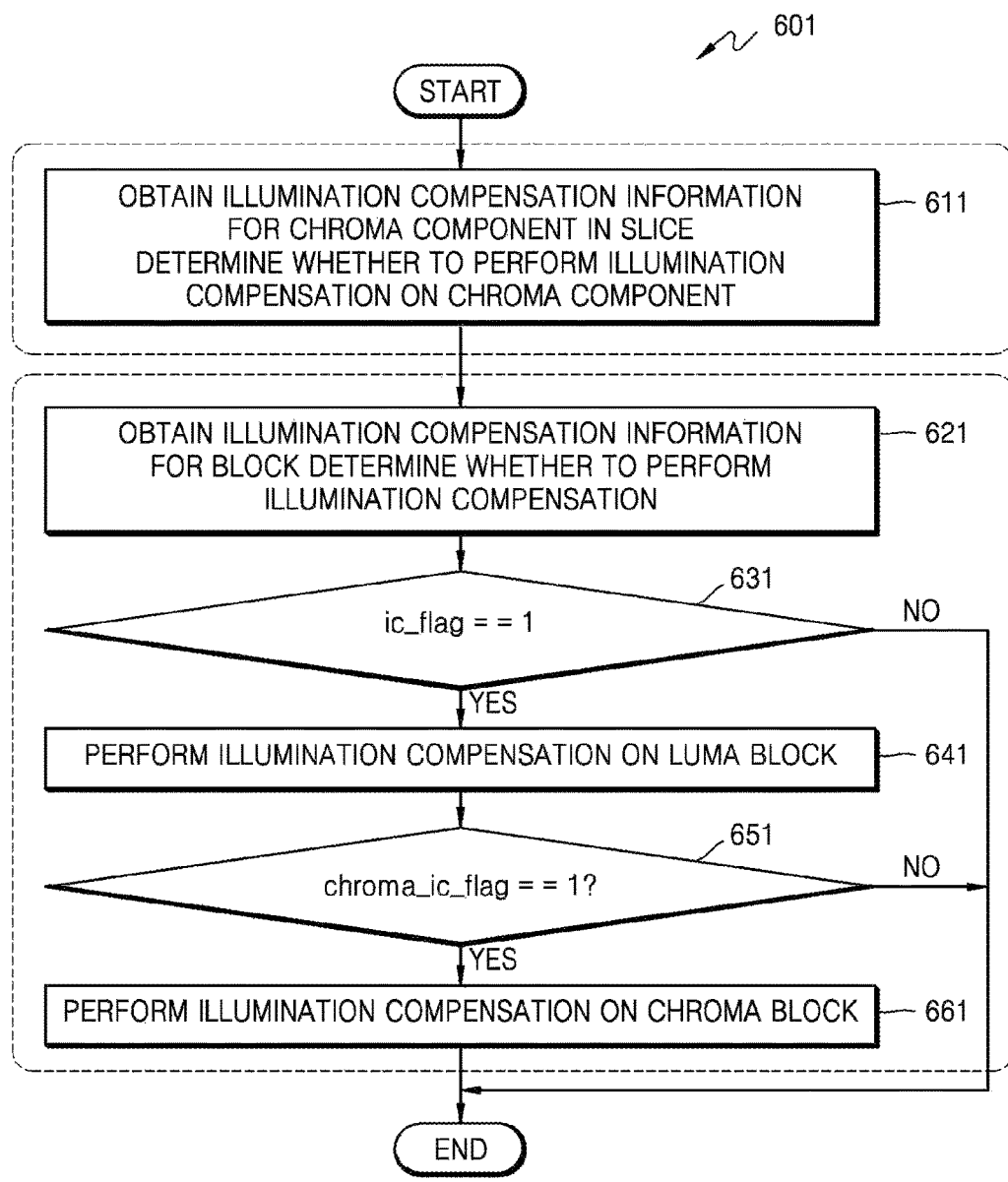

FIG. 6C

```
Slice_header() {             ← 68
  ...
  if(!dependent_slice_flag) {
    ...
      if((weighted_pred_flag  &slice_type == P) ||
         (weighted_bipred_flag && slice_type == B))
      pred_weight_table( )
      else if(layer_id && !DepthFlag) {
        slice_ic_enable_flag
        if(slice_ic_enable_flag)          ┐
          slice_chroma_ic_enable_flag     │ 69
      }                                   ┘
    ...
  }
  ...
}
```

FIG. 7A

```
coding_unit(x0, y0, log2CbSize, ctDepth) {
    ...
    if(slice_type != I &&!MotionInhFlag[x0][y0])
        skip_flag[x0][y0]
    if(skip_flag[x0]y0])
        prediction_unit(x0, y0, log2CbSize)
    else {
        ...
    }
    if (icEnableFlag)
        ic_flag
    if (resPredEnableFlag && !ic_flag)
        res_pred_flag
```

71: if (icEnableFlag) / ic_flag
72: if (resPredEnableFlag && !ic_flag) / res_pred_flag

FIG. 7B

```
coding_unit(x0, y0, log2CbSize, ctDepth) {        ← 75
    ...
    if(slice_type != I &&!MotionInhFlag[x0][y0])
        skip_flag[x0][y0]
    if(skip_flag[x0]y0])
        prediction_unit(x0, y0, log2CbSize)
    else {
        ...
    }
    if (icEnableFlag)                              ⎫
        res_pred_flag                              ⎬ 76
    if (icEnableFlag && !res_pred_flag)            ⎫
        ic_flag                                    ⎬ 77
```

FIG. 14
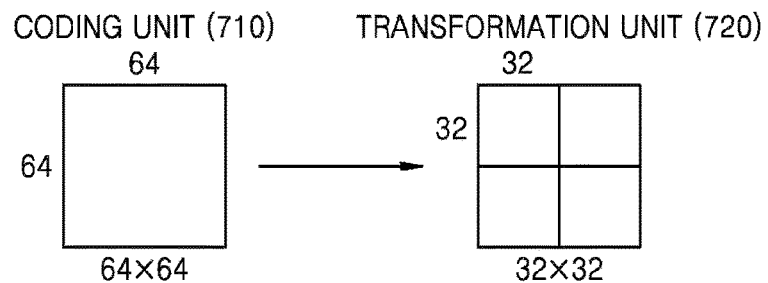
FIG. 15
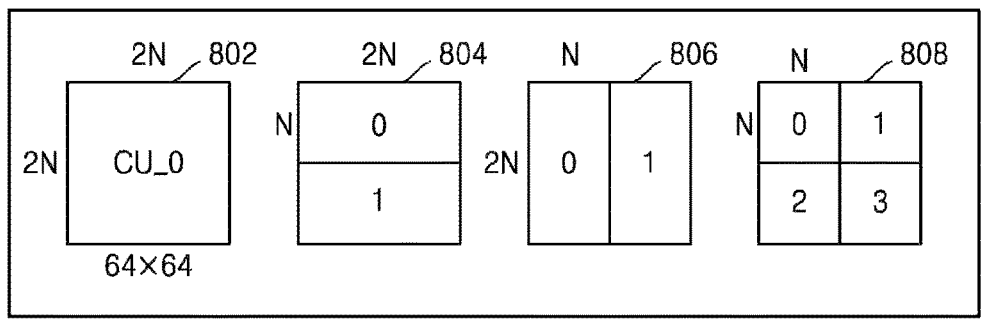
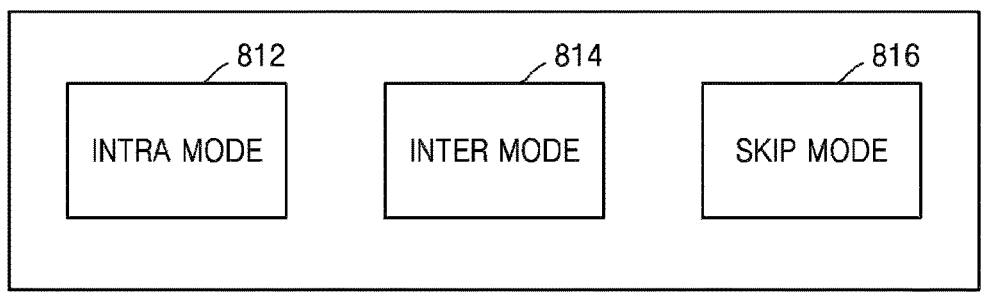
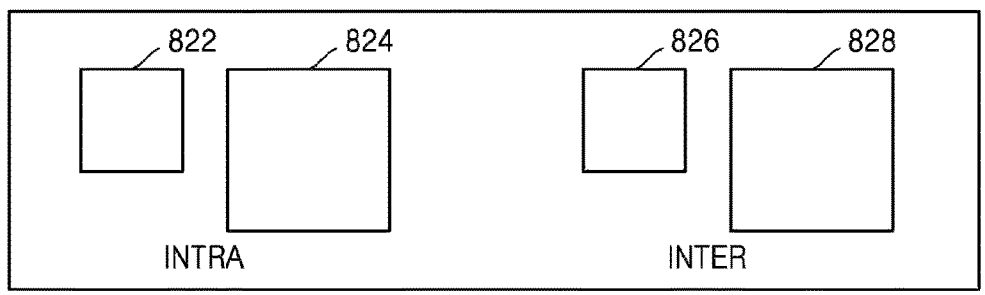

CODING UNIT (1010)

PREDICTION UNIT (1060)

METHOD FOR ENCODING INTER-LAYER VIDEO FOR COMPENSATING LUMINANCE DIFFERENCE AND DEVICE THEREFOR, AND METHOD FOR DECODING VIDEO AND DEVICE THEREFOR

CROSS-REFERENCE TO RELATED APPLICATIONS

This application is a National Stage of International Application No. PCT/KR2014/000314 filed on Jan. 10, 2014, claiming the benefit of U.S. Provisional Application No. 61/750,966 filed on Jan. 10, 2013, the contents of which are incorporated herein by reference in their entirety.

BACKGROUND

1. Field

The present disclosure relates to inter-layer video encoding and decoding methods. In more detail, the present disclosure relates to a method of compensating for an illumination difference between inter-layer images.

2. Related Art

As hardware for reproducing and storing high resolution or high quality video content is being developed and supplied, a need for a video codec for effectively encoding or decoding the high resolution or high quality video content is increasing. According to a video codec of the related art, a video is encoded according to a limited encoding method based on a macroblock having a predetermined size.

Image data of a spatial domain is transformed into coefficients of a frequency domain via frequency transformation. According to a video codec, an image is split into blocks of predetermined size, discrete cosine transformation (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

With the demand for video captured with various image qualities or captured at multiple views, a transmission amount of video data that corresponds to the number of image quality levels or the number of views can be a problem. Thus, much effort is being continuously made to efficiently encode and decode a multiview video and to decrease a transmission data amount.

A multilayer video codec encodes and decodes a first layer video and one or more second layer videos. By removing temporal/spatial redundancy of the first layer video and the second layer video, and redundancy between layers, amounts of data of the first layer video and the second layer video may be reduced.

SUMMARY

The present disclosure provides one or more exemplary embodiments of an inter-layer video encoding method and apparatus therefor that encode an image sequence according to one or more layers, determine whether to perform illumination compensation according to an image characteristic of a block of other layer images, and compensate for an illumination difference, and an inter-layer video decoding method and apparatus therefor.

According to an aspect of an exemplary embodiment, there is provided an inter-layer video decoding method including operations of reconstructing a first layer image, based on encoding information obtained from a first layer bitstream; in order to reconstruct a second layer block determined as a predetermined partition type and to be in a prediction mode, determining whether to perform illumination compensation for the reconstructed second layer block determined by using a first layer reference block that is from among the reconstructed first layer image and corresponds to the second layer block; and generating the reconstructed second layer block by using inter-layer prediction information obtained from a second layer bitstream and the first layer reference block, and generating a second layer image including the reconstructed second layer block whose illumination is determined according to whether the illumination compensation was performed.

According to an aspect of an exemplary embodiment, there is provided an inter-layer video decoding method including operations of reconstructing a first layer image, based on encoding information obtained from a first layer bitstream; in order to reconstruct a second layer block determined as a predetermined partition type and to be in a prediction mode, determining whether to perform illumination compensation for the reconstructed second layer block determined by using a first layer reference block that is from among the reconstructed first layer image and corresponds to the second layer block; and generating the reconstructed second layer block by using inter-layer prediction information obtained from a second layer bitstream and the first layer reference block, and generating a second layer image including the reconstructed second layer block whose illumination is determined according to whether the illumination compensation was performed.

The operation of determining whether to perform the illumination compensation may include operations of obtaining partition type information and prediction mode information of the second layer block from the second layer bitstream; if the partition type information indicates the predetermined partition type and the prediction mode information does not indicate an intra-prediction mode, obtaining illumination compensation information for the second layer block from the second layer bitstream; and determining, based on the illumination compensation information for the second layer block, whether to perform the illumination compensation on the reconstructed second layer block.

The operation of determining whether to perform the illumination compensation may include an operation of obtaining the illumination compensation information for a block for which the partition type information indicates a 2N×2N type and the prediction mode information does not indicate the intra-prediction mode.

The operation of determining whether to perform the illumination compensation may include an operation of obtaining, based on the partition type information and the prediction mode information, the illumination compensation information for a block that is determined to be in a skip mode or a 2N×2N merge mode.

The operation of determining whether to perform the illumination compensation may further include an operation of determining whether to perform the illumination compensation on a luma component and a chroma component of the reconstructed second layer block to be illumination-compensated, according to a size of a current partition of the reconstructed second layer block. For example, the operation of determining may include operations of determining to perform the illumination compensation on a luma component of a block whose partition size is 8×8, and determining not to perform the illumination compensation on a chroma component of the block whose partition size is 8×8.

The operation of determining whether to perform the illumination compensation may include an operation of differing with respect to determining whether to perform the illumination compensation on a luma component and a chroma component of the reconstructed second layer block, according to a size of the reconstructed second layer block. For example, the determining may include an operation of determining to perform the illumination compensation on a luma component of a block when a size of a partition (with respect to the luma component of the block) is equal to or greater than 8×8. The determining may include an operation of determining to perform the illumination compensation on a chroma component of a block when a size of a partition of luma component of the block is greater than 8×8.

The operation of determining whether to perform the illumination compensation may be skipped for other second layer blocks, except for the second layer block determined as the predetermined partition type and to be in the prediction mode. Also, the illumination compensation may not be performed on the other second layer blocks.

When illumination-compensation is determined to be performed on the second layer block, the residual prediction may not be performed on the second layer block to predict residual information of the second layer block by using residual information of at least one reference block of a temporal-direction reference block and an inter-layer direction reference block.

When the residual prediction is determined to be performed on the second layer block to predict residual information of the second layer block by using residual information of at least one reference block of a temporal-direction reference block and an inter-layer direction reference block, the illumination compensation may not be performed on the second layer block.

According to an aspect of another exemplary embodiment, there is provided an inter-layer video encoding method including operations of generating a first layer bitstream including encoding information generated by encoding a first layer image; in order to reconstruct a second layer block determined as a predetermined partition type and to be in a prediction mode, determining whether to perform illumination compensation for the reconstructed second layer block determined by using a first layer reference block that is from among the reconstructed first layer image and corresponds to the second layer block; and generating a second layer bitstream including inter-layer prediction information generated by performing inter-layer prediction between second layer blocks and first layer reference blocks corresponding to the second layer blocks, and including inter-layer prediction information between the first layer reference block and the second layer block whose illumination is determined according to whether the illumination compensation was performed.

The determining of whether to perform the illumination compensation may include operations of determining partition type information and prediction mode information of the second layer block; and if the partition type information indicates the predetermined partition type and the prediction mode information does not indicate the intra-prediction mode, determining illumination compensation information indicating whether to perform the illumination compensation on the reconstructed second layer block, and the generating of the second layer bitstream may include an operation of generating the second layer bitstream including the partition type information, prediction mode information, and illumination compensation information for the second layer block that does not indicate the intra-prediction mode but is the predetermined partition type.

The determining of whether to perform the illumination compensation may further include operations of determining whether to perform the illumination compensation on a luma component and a chroma component of the reconstructed second layer block to be illumination-compensated, according to a size of a current partition of the reconstructed second layer block. For example, the determining may include operations of determining to perform the illumination compensation on a luma component when a partition size is 8×8; and determining not to perform the illumination compensation on a chroma component when the partition size is 8×8.

The operation of determining whether to perform the illumination compensation may include an operation of differing with respect to determining whether to perform the illumination compensation on a luma component and a chroma component of the reconstructed second layer block, according to a size of the reconstructed second layer block. For example, the determining may include an operation of determining to perform the illumination compensation on a luma component of a block if a size of a partition (with respect to the luma component of the block) is equal to or greater than 8×8. The determining may include an operation of determining to perform the illumination compensation on a chroma component of a block if a size of a partition of the luma component of the block is greater than 8×8.

The operation of determining whether to perform the illumination compensation may be skipped for other second layer blocks, except for the second layer block determined as the predetermined partition type and to be in the prediction mode, and the illumination compensation is not performed on the other second layer blocks. When illumination-compensation is determined to be performed on the second layer block, the residual prediction may not be performed on the second layer block to predict residual information of the second layer block by using residual information of at least one reference block of a temporal-direction reference block and an inter-layer direction reference block.

When the residual prediction is determined to be performed on the second layer block to predict residual information of the second layer block by using residual information of at least one reference block of a temporal-direction reference block and an inter-layer direction reference block, the illumination compensation may not be performed on the second layer block.

According to an aspect of another exemplary embodiment, there is provided an inter-layer video decoding apparatus including a first layer decoder for reconstructing a first layer image, based on encoding information obtained from a first layer bitstream; an illumination compensation determiner for determining, in order to reconstruct a second layer block determined as a predetermined partition type and to be in a prediction mode, whether to perform illuminationn compensation for the reconstructed second layer block determined by using a first layer reference block that is from among the reconstructed first layer image and corresponds to the second layer block; and a second layer decoder for generating the reconstructed second layer block by using inter-layer prediction information obtained from a second layer bitstream and the first layer reference block, and generating a second layer image including the reconstructed second layer block whose illumination is determined according to whether the illumination compensation was performed.

According to an aspect of another exemplary embodiment, there is provided an inter-layer video encoding apparatus including a first layer encoder for generating a first layer bitstream including encoding information generated by encoding a first layer image; an illumination compensation determiner for determining, in order to reconstruct a second layer block determined as a predetermined partition type and to be in a prediction mode, whether to perform illumination compensation for the reconstructed second layer block determined by using a first layer reference block that is from among the reconstructed first layer image and corresponds to the second layer block; and a second layer encoder for generating a second layer bitstream including inter-layer prediction information generated by performing inter-layer prediction between second layer blocks and first layer reference blocks corresponding to the second layer blocks, and including inter-layer prediction information between the first layer reference block and the second layer block whose illumination is determined according to whether the illumination compensation was performed.

According to an aspect of another exemplary embodiment, there is provided a computer-readable recording medium having recorded thereon a program for executing the inter-layer video decoding method. According to another aspect of the present disclosure, there is provided a computer-readable recording medium having recorded thereon a program for executing the inter-layer video encoding method.

According to one or more exemplary embodiments, whether to perform illumination compensation is determined only for a block that relatively more requires illumination compensation, and the illumination compensation is not performed on other blocks. Thus, an increase in a calculation load may be decreased, and coding efficiency may be improved due to the illumination compensation.

BRIEF DESCRIPTION OF THE DRAWINGS

FIG. 5 illustrates a syntax for performing illumination compensation according to a partition type and a prediction mode of a current block, according to an exemplary embodiment.

FIG. 6B illustrates a flowchart of an illumination compensating method performed by the inter-layer video decoding apparatus, according to another exemplary embodiment.

FIG. 6C illustrates a syntax for performing illumination compensation according to color components, according to another exemplary embodiment.

FIGS. 7A and 7B illustrate syntaxes for determining whether to perform illumination compensation and residual prediction on each of blocks.

FIG. 14 is a diagram for describing a relationship between a coding unit and transformation units, according to exemplary embodiments.

FIG. 15 illustrates a plurality of pieces of encoding information according to depths, according to exemplary embodiments.

DETAILED DESCRIPTION OF EXEMPLARY EMBODIMENTS

Hereinafter, an inter-layer video encoding technique and an inter-layer video decoding technique that determine whether to perform illumination compensation according to a block characteristic, according to exemplary embodiments, are provided with reference to FIGS. 1A through 7B. Also, a video encoding technique and a video decoding technique based on coding units of a tree structure according to exemplary embodiments, which may be applied to the inter-layer video encoding technique and the inter-layer video decoding technique, are provided with reference to FIGS. 8 through 20. Also, various embodiments to which the video encoding technique and the video decoding technique may be applied are provided with reference to FIGS. 21 through 27.

Hereinafter, an 'image' may indicate a still image or a moving image of a video, or a video itself.

Hereinafter, a 'sample' means data that is allocated to a sampling position of an image and is a processing target. For example, pixels in an image in a spatial domain may be samples.

First, with reference to FIGS. 1A through 7B, an inter-layer video encoding apparatus and an inter-layer video encoding method, and an inter-layer video decoding apparatus and an inter-layer video decoding method according to exemplary embodiments are provided.

Figure 1A:
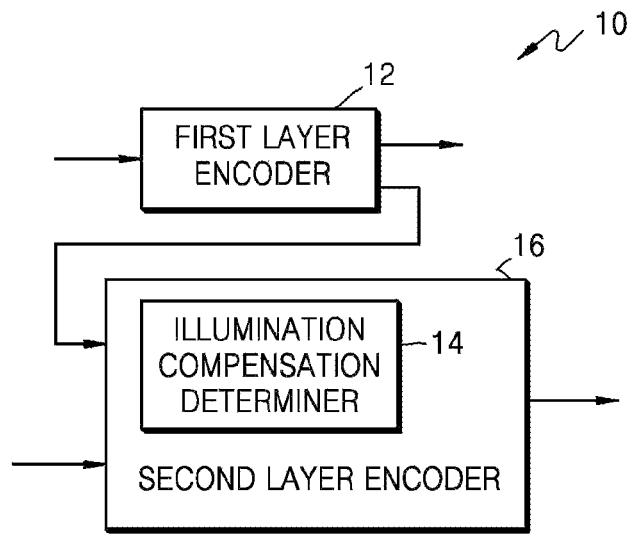
FIG. 1A illustrates a block diagram of an inter-layer video encoding apparatus, according to an exemplary embodiment.
Figure 1B:
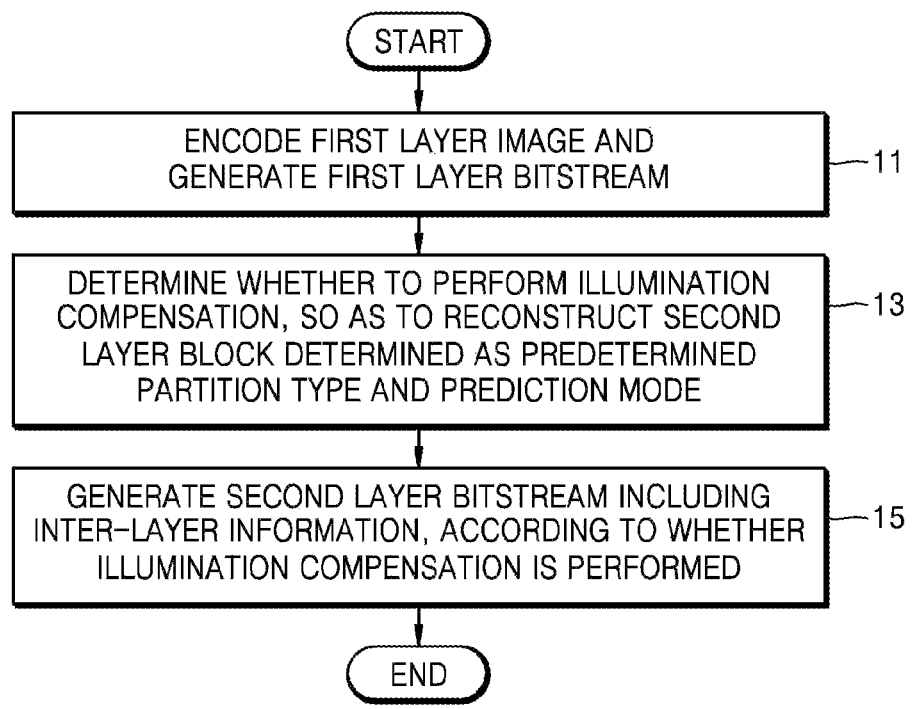
FIG. 1B illustrates a flowchart of an inter-layer video encoding method, according to an exemplary embodiment.

FIG. 1A illustrates a block diagram of an inter-layer video encoding apparatus 10, according to an exemplary embodiment. FIG. 1B illustrates a flowchart of an inter-layer video encoding method, according to an exemplary embodiment.

The inter-layer video encoding apparatus 10 according to the present exemplary embodiment includes a first layer encoder 12, an illumination compensation determiner 14, and a second layer encoder 16. The illumination compensation determiner 14 may be formed outside the second layer encoder 16.

The inter-layer video encoding apparatus 10 according to the present exemplary embodiment may encode each of a plurality of image sequences according to layers by using a scalable video coding method, and may output a separate stream including encoded data of each of the layers. The inter-layer video encoding apparatus 10 may encode a first layer image sequence and a second layer image sequence to different layers.

The first layer encoder 12 may encode first layer images, and may output a first layer stream including encoded data of the first layer images.

The second layer encoder 16 may encode second layer images, and may output a second layer stream including encoded data of the second layer images.

For example, according to the scalable video coding method based on spatial scalability, low resolution images may be encoded as the first layer images, and high resolution images may be encoded as the second layer images. An encoding result of the first layer images may be output as a first layer stream, and an encoding result of the second layer images may be output as a second layer stream.

As another example, a multiview video may be encoded according to the scalable video coding method. Left-view images may be encoded as the first layer images, and right-view images may be encoded as the second layer images. Alternatively, each of center-view images, left-view images, and right-view images may be encoded, and among these images, the center-view images may be encoded as the first layer images, the left-view images may be encoded as first second-layer images, and the right-view images may be encoded as second second-layer images.

As another example, the scalable video coding method may be performed according to temporal hierarchical prediction based on temporal scalability. A first layer stream including encoding information may be output, wherein the encoding information is generated by encoding images with a base frame rate. Temporal levels may be classified according to frame rates, and may be encoded to layers, respectively. By further encoding images with a high speed frame rate by referring to the images of the base frame rate, a second layer stream including encoding information about the high speed frame rate may be output.

Also, scalable video coding may be performed on a first layer and a plurality of second layers. In a case where the number of the second layers is equal to or greater than 3, first layer images, first second-layer images, second second-layer images, . . . , and $K_{th}$ second-layer images may be encoded. Accordingly, an encoding result of the first layer images may be output as a first layer stream, and encoding results of the first second-layer images, the second second-layer images, . . . , and the $K_{th}$ second-layer images may be output as a first second-layer stream, a second second-layer stream, . . . , and a $K_{th}$ second-layer stream, respectively.

The inter-layer video encoding apparatus 10 according to the present exemplary embodiment may perform inter prediction by which a current image is predicted by referring to images of a single layer. Via the inter prediction, a motion vector indicating motion information between the current image and a reference image, and a residual component between the current image and the reference image may be generated.

Also, the inter-layer video encoding apparatus 10 may perform inter-layer prediction by which second layer images are predicted by referring to first layer images.

Also, when the inter-layer video encoding apparatus 10 according to the present exemplary embodiment allows at least three layers of a first layer, a second layer, a third layer, etc., the inter-layer video encoding apparatus 10 may perform the inter-layer prediction between a first layer image and a third layer image, and may perform the inter-layer prediction between a second layer image and the third layer image, according to a multilayer prediction structure.

Via the inter-layer prediction, a location difference component between a reference image of another layer and the current image, and a residual component between the reference image of the other layer and the current image may be generated.

An inter-layer prediction structure will be described in detail with reference to FIG. 3.

The inter-layer video encoding apparatus 10 according to the present exemplary embodiment encodes each of blocks of each of images of a video according to layers. A type of a block may be a square, a rectangle, or a random geometric shape. A block is not limited to a data unit of a constant size. The block may be a maximum coding unit, a coding unit, a prediction unit, a transformation unit, etc. from among coding units of a tree structure. A maximum coding unit including coding units of a tree structure may be variously called a coding block tree, a block tree, a root block tree, a coding tree, a coding root, or a tree trunk. Video encoding and decoding methods using the coding units of the tree structure will be described with reference to FIGS. 8 through 20.

The inter prediction and the inter-layer prediction may be performed by using a data unit of the coding unit, the prediction unit, or the transformation unit.

The first layer encoder 12 according to the present exemplary embodiment may generate symbol data by performing source coding operations including the inter prediction or intra prediction on the first layer image. The symbol data indicates a sample value of each encoding parameter, and a sample value of a residual component.

First, the first layer encoder 12 may generate the symbol data by performing the inter prediction or intra prediction, transformation, and quantization on samples of a data unit of the first layer images, and may generate the first layer stream by performing entropy encoding on the symbol data.

The second layer encoder 16 may encode the second layer images, based on the coding units of the tree structure. The second layer encoder 16 may generate symbol data by performing the inter prediction or intra prediction, the transformation, and the quantization on samples of an encoding unit of a second layer image, and may generate the second layer stream by performing entropy encoding on the symbol data.

The second layer encoder 16 according to the present exemplary embodiment may perform inter-layer prediction to predict the second layer image, by using a reconstructed sample of the first layer image. In order to encode a second layer original image among the second layer image sequence via the inter-layer prediction structure, the second layer encoder 16 may generate a second layer prediction image by using a reconstructed first layer image, and may encode a prediction error between the second layer original image and the second layer prediction image.

The second layer encoder 16 may perform the inter-layer prediction on the second layer image according to blocks such as the coding unit or the prediction unit. A block of the first layer image to be referred to by a block of the second layer image may be determined. For example, a reconstructed block of the first layer image that is positioned while corresponding to a position of a current block in the second layer image may be determined. The second layer encoder 16 may determine a second layer prediction block by using a reconstructed first layer block corresponding to a second layer block.

The second layer encoder 16 may use the second layer prediction block as a reference image for inter-layer prediction of a second layer original block, wherein the second layer prediction block is determined by using the reconstructed first layer block according to the inter-layer prediction structure. The second layer encoder 16 may entropy encode, by using the reconstructed first layer image, a residual component according to the inter-layer prediction, i.e., a difference between a sample value of the second layer prediction block and a sample value of the second layer original block.

As described above, the second layer encoder 16 may encode a current layer image sequence by referring to reconstructed first layer images via the inter-layer prediction structure. However, the second layer encoder 16 according to the present exemplary embodiment may encode the second layer image sequence according to a single layer prediction structure, without referring to other layer samples. Therefore, it should not narrowly interpret that the second layer encoder 16 performs only the inter-layer prediction so as to encode the second layer image sequence.

As described above, when the inter-layer video encoding apparatus 10 encodes the multiview video, the first layer encoder 12 may encode a first view video, and the second layer encoder 16 may encode a second view video. Videos with different views may be photographed by using different cameras or may be obtained via different lenses. Since a camera angle, lighting, or characteristics of image-capturing equipment (e.g., a camera, a lens, etc.) may vary according to the different views, illumination may vary in the videos obtained via the different views. Such illumination mismatch may be related to a difference in sample values of the videos with different views.

If illumination varies in the videos with different views, an inter-layer prediction error increases such that encoding efficiency may deteriorate. Accordingly, in consideration of the illumination mismatch in the different views, the illumination compensation determiner 14 of the inter-layer video encoding apparatus 10 may encode the multiview video by compensating for an illumination difference in the videos with different views. For example, an illumination difference between a first view image encoded by the first layer encoder 12 and a second view image encoded by the second layer encoder 16 may be encoded. Since the illumination difference between the first view image and the second view image is encoded, when the second layer encoder 16 encodes a second view video, illumination compensation may be performed.

According to an exemplary embodiment, in order to compensate for an illumination difference by comparing a first layer block and a second layer block, a difference between a sample average value of the first layer block and a sample average value of the second layer block may be determined as a compensation value.

However, since residual data is predicted between layers in the inter-layer prediction structure, an encoding operation of predicting an illumination difference between the layers may increase a calculation load. Accordingly, the illumination compensation determiner 14 according to the present exemplary embodiment may determine whether to perform the illumination compensation, by referring to a characteristic of a predetermined data unit such as a slice or a block of the current image.

Hereinafter, an operation of the inter-layer video encoding apparatus 10 that considers the illumination compensation is described in detail with reference to FIG. 1B.

FIG. 1B illustrates a flowchart of an inter-layer video encoding method, according to an exemplary embodiment.

In operation 11, the first layer encoder 12 may encode a first layer image, and may generate a first layer bitstream including sample values of generated encoding information. The illumination compensation determiner 14 may encode a second layer image, and may generate a second layer bitstream including sample values of generated encoding information. If the inter-layer video encoding apparatus 10 encodes a multiview video, the first layer image may correspond to a first view image, and the second layer image may correspond to a second view image. Each of the first layer encoder 12 and the second layer encoder 16 may split an image into blocks and may encode each of the blocks.

In operation 13, the illumination compensation determiner 14 may determine whether to perform illumination compensation on each of blocks of the second layer image, based on a reconstructed first layer block.

In operation 15, the second layer encoder 16 may perform inter-layer prediction to encode an error between the first layer image and the second layer image, so that a residual component between reference blocks (first layer reference blocks) of the first layer image that correspond to blocks (second layer blocks) of the second layer image may be encoded. Thus, the second layer bitstream may include various types of inter-layer prediction information indicating an inter-layer encoding method, and an inter-layer residual component.

In more detail with respect to the operation 13, in order to reconstruct a second layer block, the illumination compensation determiner 14 may determine whether to perform the illumination compensation for the second layer block determined by using a first layer reference block that corresponds to the second layer block and is of a reconstructed first layer image. The illumination compensation determiner 14 may determine whether to perform the illumination compensation on the second layer block determined as a predetermined partition type and to be in a prediction mode.

The second layer encoder 16 may determine partition type information indicating a partition type of the second layer block, and may determine prediction mode information indicating a prediction mode of the second layer block. In a case where the partition type information indicates the predetermined partition type, and the prediction mode information is not an intra prediction mode, the illumination compensation determiner 14 may determine illumination compensation information indicating whether to perform the illumination compensation on the second layer block.

The second layer encoder 16 may generate a second layer bitstream including the partition type information, the prediction mode information, and the illumination compensation information for the second layer block that is the predetermined partition type and does not indicate the intra prediction mode.

For example, the illumination compensation determiner 14 may determine illumination compensation information for a block whose partition type information indicates a 2N×2N type.

For example, the illumination compensation determiner 14 may determine illumination compensation information for a block whose partition type information indicates a 2N×2N type and whose prediction mode information does not indicate an intra prediction mode.

Also, the illumination compensation determiner 14 may determine illumination compensation information for a block that indicates a skip mode or is determined to be in a 2N×2N merge mode, based on partition type information and prediction mode information.

Also, the illumination compensation determiner 14 may determine, according to a size of a current partition, whether to perform illumination compensation on a luma component and a chroma component of the block to be illumination-compensated. For example, it may be determined to perform the illumination compensation on a luma component of a block whose partition size is 8×8, and may be determined not to perform the illumination compensation on a chroma component of a block whose partition size is 8×8.

Also, the illumination compensation determiner 14 may differ with respect to determining whether to perform the illumination compensation on the luma component and the chroma component of the block, according to a size of the block. For example, the illumination compensation determiner 14 may determine to perform the illumination compensation on a luma component of a block if a partition size of the luma component of the block is equal to or greater than 8×8. The illumination compensation may be performed only on a chroma component of a block if a partition size of a luma component of the block is greater than 8×8. A partition size of a chroma component of a block may be 4×4 if a partition size of a luma component of the block is 8×8. If the illumination compensation is performed on a block with a 4×4 size, a calculation load is increased, so that the illumination compensation is not performed on the chroma component of the block if the partition size of the luma component of the block is 8×8, and the illumination compensation may be performed on the chroma component of the block if the partition size of the luma component of the block is greater than 8×8.

The illumination compensation determiner 14 may skip an operation of determining whether to perform the illumination compensation on other second layer blocks except for the block determined as the predetermined partition type and to be in the prediction mode.

However, according to the inter-layer encoding method, the partition type or the prediction mode of the second layer block may be determined to be equal to a partition type and a prediction mode of a first layer block corresponding to the second layer block. In this case, even if the illumination compensation determiner 14 is formed outside the second layer encoder 16, the illumination compensation determiner 14 may predict the partition type and the prediction mode of the second layer block by using sample values of partition type information and prediction mode information of the first layer block. Therefore, the illumination compensation determiner 14 may determine whether to perform the illumination compensation on the second layer block, based on the predicted partition type and the predicted prediction mode of the second layer block.

Also, the second layer encoder 16 may not perform residual prediction on the second layer block determined to be illumination-compensated, wherein the residual prediction is to predict residual information of the second layer block by using residual information of at least one reference block of a temporal-direction reference block and an inter-layer direction reference block. Therefore, information indicating whether to perform the residual prediction may be determined only for a block (a slice or a picture) determined not to be illumination-compensated.

The second layer encoder 16 may not perform an operation on a second layer block so as to compensate for a difference between illumination of the first layer reference block and illumination of the second layer reference block, wherein the second layer block is determined to be residual-predicted so as to predict residual information of the second layer block by using residual information of at least one reference block of a temporal-direction reference block and an inter-layer direction reference block. Thus, the illumination compensation information may be determined only for a block (a slice or a picture) that is determined not to be residual-predicted.

Also, according to the determination by the illumination compensation determiner 14, the illumination of the second layer reference block may be determined via the illumination compensation, or the illumination of the second layer reference block may be determined without the illumination compensation. Thus, in the operation 15, the second layer encoder 16 may generate the second layer bitstream including the inter-layer prediction information about inter-layer prediction between the first layer reference block and the second layer block whose illumination is determined according to whether the illumination compensation was performed.

When illumination of the second layer image is adjusted, in consideration of the first layer image, a difference between the second layer image and the first layer image is further decreased, so that encoding efficiency of the inter-layer prediction may be improved. Also, the illumination compensation may be priorly considered in a particular encoding mode according to an encoding mode of a block.

The inter-layer video encoding apparatus 10 according to the present exemplary embodiment may include a central processor (not shown) that generally controls the first layer encoder 12, the illumination compensation determiner 14, and the second layer encoder 16. Alternatively, each of the first layer encoder 12, the illumination compensation determiner 14, and the second layer encoder 16 may be driven by its own processor (not shown), and the processors may interoperate with each other, so that the inter-layer video encoding apparatus 10 may operate. Alternatively, according to control by an external processor (not shown) of the inter-layer video encoding apparatus 10, the first layer encoder 12, the illumination compensation determiner 14, and the second layer encoder 16 may be controlled.

The inter-layer video encoding apparatus 10 may include one or more data storage units (not shown) for storing input and output data of the first layer encoder 12, the illumination compensation determiner 14, and the second layer encoder 16. The inter-layer video encoding apparatus 10 may include a memory controller (not shown) that manages an input and output of data of the one or more data storage units.

The inter-layer video encoding apparatus 10 may interoperate with an internal video encoding processor that is internally embedded or an external video encoding processor so as to output a video encoding result, so that the inter-layer video encoding apparatus 10 may perform a video encoding operation including transformation. The internal video encoding processor of the inter-layer video encoding apparatus 10 may correspond to not only a separate processor but also may correspond to a case in which a central processing unit (CPU) or a graphical operational unit of the inter-layer video encoding apparatus 10 includes a video encoding processing module and thus performs a basic video encoding operation.

Figure 2A:
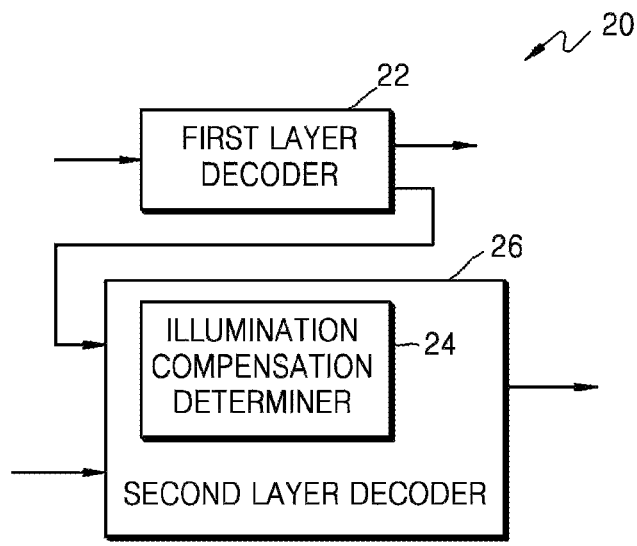
FIG. 2A illustrates a block diagram of an inter-layer video decoding apparatus, according to an exemplary embodiment.

FIG. 2A illustrates a block diagram of an inter-layer video decoding apparatus 20, according to an exemplary embodiment.

The inter-layer video decoding apparatus 20 according to the present exemplary embodiment includes a first layer decoder 22, an illumination compensation determiner 24, and a second layer decoder 26. The illumination compensation determiner 24 may be included in the second layer decoder 26. The illumination compensation determiner 24 according to another exemplary embodiment may be formed outside the second layer decoder 26.

The inter-layer video decoding apparatus 20 according to the present exemplary embodiment may receive bitstreams according to layers, based on a scalable encoding method. The number of layers of the bitstreams that the inter-layer video decoding apparatus 20 receives is not limited. However, for convenience of description, hereinafter, in an exemplary embodiment, the first layer decoder 22 of the inter-layer video decoding apparatus 20 receives and decodes a first layer stream, and the second layer decoder 26 receives and decodes a second layer stream.

For example, the inter-layer video decoding apparatus 20 based on spatial scalability may receive a stream in which image sequences having different resolutions are encoded to different layers. A low resolution image sequence may be reconstructed by decoding a first layer stream, and a high resolution image sequence may be reconstructed by decoding a second layer stream.

As another example, a multiview video may be decoded by using a scalable video coding method. When a stereoscopic video stream having a plurality of layers is received, left-view images may be reconstructed by decoding a first layer stream. By further decoding a second layer stream in addition to the first layer stream, right-view images may be reconstructed.

Alternatively, when a multiview video stream having a plurality of layers is received, center-view images may be reconstructed by decoding a first layer stream. By further decoding a second layer stream in addition to the first layer stream, left-view images may be reconstructed. By further decoding a third layer stream in addition to the first layer stream, right-view images may be reconstructed.

As another example, a scalable video coding method based on temporal scalability may be performed. By decoding the first layer stream, images with a base frame rate may be reconstructed. By further decoding the second layer stream in addition to the first layer stream, images with a high speed frame rate may be reconstructed.

In a case where the number of second layers is equal to or greater than 3, first layer images may be reconstructed from the first layer stream, and second layer images may be further reconstructed by further decoding the second layer by referring to the reconstructed first layer images. If a $K_{th}$ layer stream is further decoded by referring to the reconstructed second layer image, $K_{th}$ layer images may be further reconstructed.

The inter-layer video decoding apparatus 20 may obtain encoded data of the first layer images and the second layer images from the first layer stream and the second layer stream, and may further obtain a motion vector generated by inter prediction, and prediction information generated by inter-layer prediction.

For example, the inter-layer video decoding apparatus 20 may decode inter-predicted data of each of layers, and may decode data that is inter-layer predicted between a plurality of layers. The reconstruction may be performed by using motion compensation and inter-layer decoding, based on a coding unit or a prediction unit.

Images of each layer stream may be reconstructed by performing motion compensation for a current image by referring to reconstructed images that are predicted via inter prediction with respect to a same layer. The motion compensation means an operation of reconstructing a reconstructed image of the current image by synthesizing a reference image and a residual component of the current image, wherein the reference image is determined by using a motion vector of the current image.

Also, the inter-layer video decoding apparatus 20 may perform the inter-layer decoding by referring to the first layer images, so as to reconstruct the second layer image predicted via the inter-layer prediction. The inter-layer decoding means an operation of reconstructing a reconstructed image of the current image by synthesizing a reference image of another layer and the residual component of the current image, wherein the reference image is determined to predict the current image.

The inter-layer video decoding apparatus 20 according to the present exemplary embodiment may perform the inter-layer decoding so as to reconstruct third layer images that are predicted by referring to the second layer images. An inter-layer prediction structure will be described in detail with reference to FIG. 3.

However, the second layer decoder 26 according to the present exemplary embodiment may decode the second layer stream, without referring to the first layer image sequence. Therefore, it should not narrowly interpret that the second layer decoder 26 performs the inter-layer prediction so as to decode a second layer image sequence.

The inter-layer video decoding apparatus 20 decodes each of blocks of each of images of a video. The block may be a maximum coding unit, a coding unit, a prediction unit, a transformation unit, etc. from among coding units of a tree structure.

The first layer decoder 22 may decode the first layer image by using encoding symbols of a parsed first layer image. If the inter-layer video decoding apparatus 20 receives streams that are encoded based on the coding units of the tree structure, the first layer decoder 22 may perform decoding on each maximum coding unit of the first layer stream, based on the coding units of the tree structure.

The first layer decoder 22 may perform entropy decoding on each maximum coding unit, and thus may obtain encoding information and the encoded data. The first layer decoder 22 may perform inverse-quantization and inverse-transformation on the encoded data obtained from the stream, and thus may reconstruct a residual component. The first layer decoder 22 according to another exemplary embodiment may directly receive a bitstream of quantized transform coefficients. As a result of the inverse-quantization and the inverse-transformation that are performed on the quantized transform coefficients, a residual component of images may be reconstructed.

The first layer decoder 22 may reconstruct the first layer images by combining a prediction image and the residual component, via motion compensation between same layer images.

According to the inter-layer prediction structure, the second layer decoder 26 may generate a second layer prediction image by using samples of the reconstructed first layer image. The second layer decoder 26 may decode the second layer stream, and may obtain a prediction error due to the inter-layer prediction. The second layer decoder 26 may generate the reconstructed second layer image by combining the second layer prediction image with the prediction error.

The second layer decoder 26 may determine the second layer prediction image by using the reconstructed first layer image decoded by the first layer decoder 22. According to the inter-layer prediction structure, the second layer decoder 26 may determine a block of the first layer image that is to be referred to by a block such as a coding unit or a prediction unit of the second layer image. For example, a reconstructed block of the first layer image that is positioned while corresponding to a position of a current block in the second layer image may be determined. The second layer decoder 26 may determine a second layer prediction block by using a reconstructed first layer block corresponding to a second layer block.

The second layer decoder 26 may use the second layer prediction block as a reference image for inter-layer prediction of a second layer original block, wherein the second layer prediction block is determined by using the reconstructed first layer block according to the inter-layer prediction structure. In this case, the second layer decoder 26 may reconstruct the second layer block by synthesizing a sample value of the second layer prediction block and a residual component obtained via the inter-layer prediction, wherein the second layer prediction block is determined by using the reconstructed first layer image.

According to a spatial scalable video coding method, when the first layer decoder 22 reconstructs a first layer image having a resolution different from that of the second layer image, the second layer decoder 26 may interpolate the reconstructed first layer image so as to adjust a size of the reconstructed first layer image to a resolution of a second layer original image. The interpolated reconstructed first layer image may be determined as a second layer prediction image for inter-layer prediction.

Therefore, the first layer decoder 22 of the inter-layer video decoding apparatus 20 may decode the first layer stream and thus may reconstruct the first layer image sequence, and the second layer decoder 26 may decode the second layer stream and thus may reconstruct the second layer image sequence.

Also, in consideration of an illumination mismatch in different views, the illumination compensation determiner 24 of the inter-layer video decoding apparatus 20 may compensate for an illumination difference between videos with different views and may reconstruct the videos with different views. For example, an illumination difference between a first view image decoded by the first layer decoder 22 and a second view image decoded by the second layer decoder 26 may be obtained from a bitstream. Since the illumination difference of the second view image with respect to the first view image is obtained, when the second layer decoder 26 decodes a second view video, whether to perform an illumination compensation operation may be determined.

The illumination compensation determiner 24 according to the present exemplary embodiment may determine whether to perform illumination compensation, in consideration of a characteristic of a predetermined data unit such as a slice or a block of the current image.

Hereinafter, an operation of the inter-layer video decoding apparatus 20 that considers the illumination compensation is described in detail with reference to FIG. 2B.

Figure 2B:
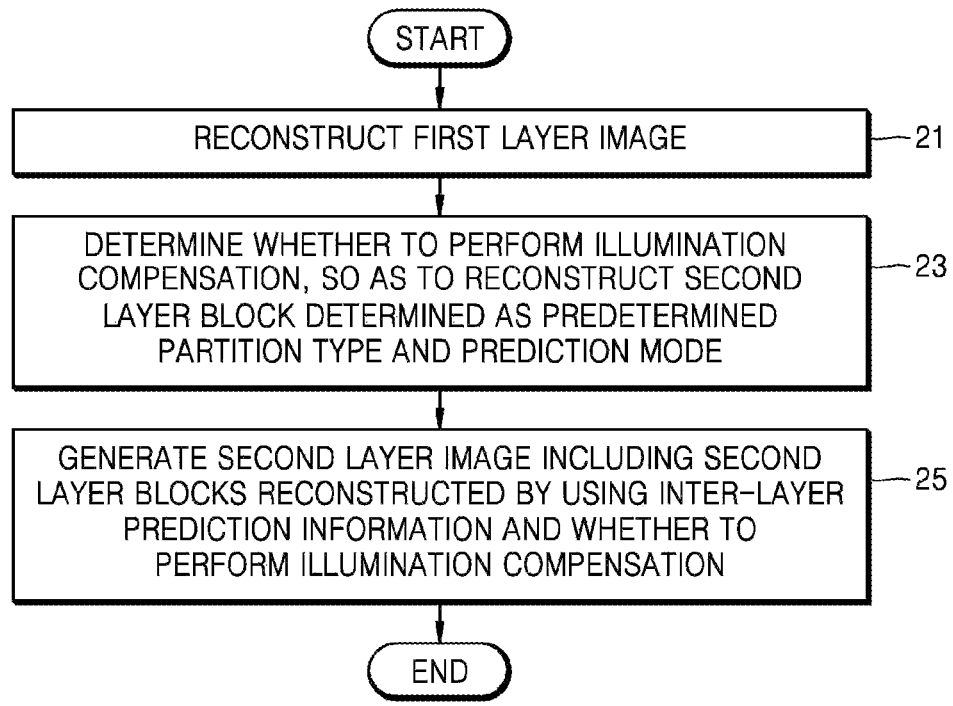
FIG. 2B illustrates a flowchart of an inter-layer video decoding method, according to an exemplary embodiment.

FIG. 2B illustrates a flowchart of an inter-layer video decoding method, according to an exemplary embodiment.

In operation 21, the first layer decoder 22 may reconstruct a first layer image, based on encoding information obtained from a first layer bitstream.

In operation 23, the illumination compensation determiner 24 may determine whether to perform illumination compensation on a second layer block determined as a predetermined partition type and to be in a prediction mode.

In operation 25, the second layer decoder 26 may determine, according to an inter-layer prediction structure, a reconstructed second layer block by using a first layer reference block of the reconstructed first layer image that corresponds to the second layer block. The reconstructed second layer block may be determined by synthesizing the first layer reference block and a residual component of inter-layer prediction information obtained from a second layer bitstream.

In order to reconstruct the second layer block that is determined, by the illumination compensation determiner 24, to be illumination-compensated, the second layer decoder 26 may compensate for an illumination difference between the first layer reference block and the second layer block.

Information about an illumination difference between layers may be obtained from a bitstream. Alternatively, an illumination value of the second layer block may be compensated by as much as a preset illumination.

According to the present exemplary embodiment, illumination compensation and inter-layer compensation may be performed together. A reconstructed sample of the second layer block may be determined in such a manner that illumination compensation is additionally performed on a sample of the second layer block that is determined by performing compensation for the residual component, on a reconstructed sample of the first layer block, according to the inter-layer prediction structure.

According to another exemplary embodiment, the illumination compensation and the inter-layer compensation may not be simultaneously performed. Since an illumination difference component may be included in the residual component between the layers according to the inter-layer prediction structure, the illumination compensation may not be performed on the sample of the second layer block that is determined by performing compensation for the residual component, on the reconstructed sample of the first layer block, according to the inter-layer prediction structure. However, the illumination compensation may be performed on the second layer block that is not compensated with respect to the residual component between the layers.

Therefore, the second layer decoder 26 may generate the reconstructed second layer image consisting of the second layer blocks that are reconstructed based on at least one of inter-layer prediction and the illumination compensation.

The illumination compensation determiner 24 may obtain partition type information and prediction mode information of the second layer block from the second layer bitstream. When the partition type information indicates the predetermined partition type, and the prediction mode information does not indicate an intra prediction mode, illumination compensation information for the second layer block may be obtained from the second layer bitstream. The illumination compensation determiner 24 may determine, based on the illumination compensation information for the second layer block, whether to perform the illumination compensation on the reconstructed second layer block.

The illumination compensation determiner 24 may obtain the illumination compensation information for a block whose partition type information indicates a 2N×2N type and whose prediction mode information does not indicate the intra prediction mode.

As another example, the illumination compensation determiner 24 may obtain the illumination compensation information for a block that indicates a skip mode or is determined to be in a 2N×2N merge mode, based on the partition type information and the prediction mode information.

The illumination compensation determiner 24 may determine, according to a size of a current partition, whether to perform the illumination compensation on a luma component and a chroma component of the block to be illumination-compensated. For example, it may be determined to perform the illumination compensation on a luma component of a block whose partition size is 8×8, and may be determined not to perform the illumination compensation on a chroma component of the block whose partition size is 8×8.

Also, the illumination compensation determiner 24 may differ with respect to determining whether to perform the illumination compensation on the luma component and the chroma component, according to a size of the block. For example, the illumination compensation determiner 24 may determine to perform the illumination compensation on a luma component of a block, wherein a partition size of the luma component is equal to or greater than 8×8. The illumination compensation may be performed only on a chroma component of a block, wherein a partition size of a luma component of the block is greater than 8×8.

The illumination compensation determiner 24 may skip an operation of determining whether to perform the illumination compensation on other second layer blocks except for the block determined as the predetermined partition type and to be in the prediction mode.

Also, the illumination compensation determiner 24 according to the present exemplary embodiment may not perform residual prediction on the second layer block determined to be illumination-compensated, wherein the residual prediction is to predict residual information of the second layer block by using residual information of at least one reference block of a temporal-direction reference block and an inter-layer direction reference block. Therefore, information indicating whether to perform the residual prediction may be determined only for a block (a slice or a picture) determined not to be illumination-compensated.

The illumination compensation determiner 24 according to another exemplary embodiment may not perform the illumination compensation to determine a sample value of the second layer block by compensating a sample value of the first layer reference block for an illumination difference, wherein the second layer block is determined to be residual-predicted so as to predict residual information of the second layer block by using residual information of at least one reference block of a temporal-direction reference block and an inter-layer direction reference block. Thus, information indicating whether to perform the illumination compensation may be obtained only for a block (a slice or a picture) that is determined not to be residual-predicted.

However, according to the inter-layer encoding method, the partition type or the prediction mode of the second layer block may be determined to be equal to a partition type and a prediction mode of a first layer block corresponding to the second layer block. In this case, even if the illumination compensation determiner 24 is formed outside the second layer encoder 26, the illumination compensation determiner 24 may predict the partition type and the prediction mode of the second layer block by using sample values of partition type information and prediction mode information of the first layer block. Therefore, the illumination compensation determiner 24 may perform whether to perform the illumination compensation on the second layer block, based on the predicted partition type and the predicted prediction mode of the second layer block.

The inter-layer video decoding apparatus 20 according to the present exemplary embodiment may include a central processor (not shown) that generally controls the first layer decoder 22, the illumination compensation determiner 24, and the second layer decoder 26. Alternatively, each of the first layer decoder 22, the illumination compensation determiner 24, and the second layer decoder 26 may be driven by its own processor (not shown), and the processors may interoperate with each other, so that the inter-layer video decoding apparatus 20 may operate. Alternatively, according to control by an external processor (not shown) of the inter-layer video decoding apparatus 20 according to the present exemplary embodiment, the first layer decoder 22, the illumination compensation determiner 24, and the second layer decoder 26 may be controlled.

The inter-layer video decoding apparatus 20 according to the present exemplary embodiment may include one or more data storage units (not shown) for storing input and output data of the first layer decoder 22, the illumination compensation determiner 24, and the second layer decoder 26. The inter-layer video decoding apparatus 20 may include a memory controller (not shown) that manages an input and output of data of the one or more data storage units.

The inter-layer video decoding apparatus 20 according to the present exemplary embodiment may interoperate with an internal video decoding processor that is internally embedded or an external video decoding processor so as to reconstruct a video via video decoding, so that the inter-layer video decoding apparatus 20 may perform a video decoding operation including inverse-transformation. The internal video decoding processor of the inter-layer video decoding apparatus 20 according to the present exemplary embodiment may correspond to not only a separate processor but also may correspond to a case in which a CPU or a graphical operational unit of the inter-layer video decoding apparatus 20 includes a video decoding processing module and thus performs a basic video decoding operation.

With reference to FIGS. 2A and 2B, while the inter-layer video decoding apparatus 20 decodes the second layer image, the inter-layer video decoding apparatus 20 performs compensation for an illumination difference between different layer images or an illumination difference between views, on a particular type of a block or slice, so that illumination between the reconstructed first layer image and the reconstructed second layer image may become uniform. With reference to FIGS. 1A and 1B, the inter-layer video encoding apparatus 10 performs the illumination compensation on the different layer images in the particular type of a block or slice, so that a residual component between a prediction image and an original image may be decreased. Therefore, decoding efficiency may be improved.

Figure 3:
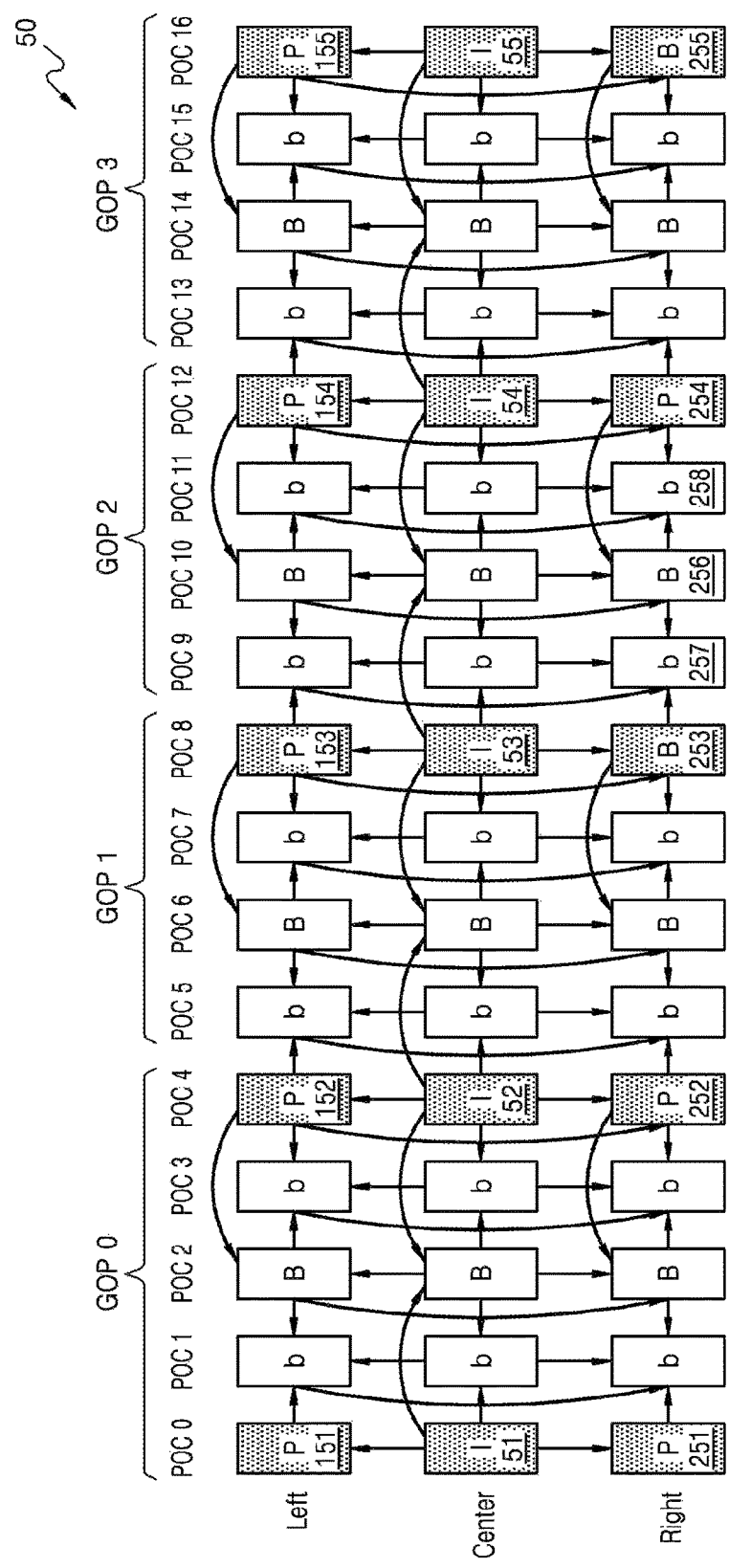
FIG. 3 illustrates an inter-layer prediction structure, according to an exemplary embodiment.

FIG. 3 illustrates an inter-layer prediction structure, according to an exemplary embodiment.

The inter-layer video encoding apparatus 10 according to the present exemplary embodiment may prediction encode base-view images, left-view images and right-view images according to a reproducing order of a multiview video prediction structure 50 shown in FIG. 3.

According to the reproducing order of the multiview video prediction structure 50, images of a same view are arrayed in a horizontal direction. Thus, left-view images marked 'Left' are horizontally arrayed in a row, base-view images marked 'Center' are horizontally arrayed in a row, and right-view images marked 'Right' are horizontally arrayed in a row. The base-view images may be center-view images, compared to the left-view/right-view images.

Also, images with a same picture order count (POC) order are arrayed in a vertical direction. A POC order of images indicates a reproducing order of the images that form a video. 'POC X' marked in the reproducing order of the multiview video prediction structure 50 indicates a relative reproducing order of images positioned in a corresponding column, and as a number of X is decreased, a reproducing order of an image is brought forward, and as the number of X is increased, a reproducing order of an image is pushed back.

Thus, according to the reproducing order of the multiview video prediction structure 50, the left-view images marked 'Left' are arrayed in a horizontal direction according to the POC order (the reproducing order), the base-view images marked 'Center' are arrayed in a horizontal direction according to the POC order (the reproducing order), and the right-view images marked 'Right' are arrayed in a horizontal direction according to the POC order (the reproducing order). Also, a left-view image and a right-view image positioned in a same column as a base-view image are images having different views and having a same POC order (a reproducing order).

For each of views, four consecutive images form one group of pictures (GOP). Each of the GOPs includes images between consecutive anchor pictures, and one anchor picture (a key picture).

An anchor picture indicates a random access point, and when a video is reproduced, if a reproducing position is randomly selected from among images that are arrayed according to a reproducing order of the images, i.e., a POC order, an anchor picture whose POC order is closest to the reproducing position is reproduced. The base-view images include base-view anchor pictures 51, 52, 53, 54, and 55, the left-view images include left-view anchor pictures 151, 152, 153, 154, and 155, and the right-view images include right-view anchor pictures 251, 252, 253, 254, and 255.

Multiview images may be reproduced and predicted (reconstructed) according to a GOP order. First, according to the reproducing order of the multiview video prediction structure 50, according to views, images included in GOP 0 may be reproduced, and then images included in GOP 1 may be reproduced. That is, images included in each GOP may be reproduced in an order of GOP 0, GOP 1, GOP 2, and GOP 3. Also, according to a coding order of a multiview video prediction structure, according to views, the images included in GOP 0 may be predicted (reconstructed), and then the images included in GOP 1 may be predicted (reconstructed). That is, in the order of GOP 0, GOP 1, GOP 2, and GOP 3, the images included in each GOP may be predicted (reconstructed).

According to the reproducing order of the multiview video prediction structure 50, inter-view prediction (inter-layer prediction) and inter-prediction are all performed on the images. In the multiview video prediction structure, an image where an arrow starts is a reference image, and an image where the arrow ends is an image that is predicted by using the reference image.

A prediction result of the base-view images may be encoded and may be output as a base-view image stream, and a prediction result of additional-view images may be encoded and may be output as a layer bitstream. Also, a prediction result of the left-view images may be output as a first layer bitstream, and a prediction result of the right-view images may be output as a second layer bitstream.

Only the inter-prediction is performed on the base-view images. That is, anchor pictures 51, 52, 53, 54, and 55 that are an I-picture type do not refer to other images, but other images that are a B-picture type and a b-picture type are predicted by referring to other base-view images. The B-picture type images are predicted by referring to an I-picture type anchor picture that is ahead in the POC order and an I-picture type anchor picture that is later in the POC order. The b-picture type images are predicted by referring to an I-picture type anchor picture that is ahead in the POC order and a B-picture type image that is later in the POC order, or are predicted by referring to a B-picture type image that is ahead in the POC order and an I-picture type anchor picture that is later in the POC order.

For the left-view images and the right-view images, the inter-view prediction (the inter-layer prediction) that refers to different-view images and the inter-prediction that refers to same-view images are performed.

The inter-view prediction (the inter-layer prediction) may be performed on the left-view anchor pictures 151, 152, 153, 154, and 155 by referring to the base-view anchor pictures 51, 52, 53, 54, and 55 that are respectively same in the POC order. The inter-view prediction may be performed on the right-view anchor pictures 251, 252, 253, 254, and 255 by referring to the base-view anchor pictures 51, 52, 53, 54, and 55 or the left-view anchor pictures 151, 152, 153, 154, and 155 that are respectively in the same POC order. Also, the inter-view prediction (the inter-layer prediction) that refers to an image having a different view and a same POC order may be performed on other images that are from among the left-view and right-view images and are not the anchor pictures 151, 152, 153, 154, 155, 251, 252, 253, 254, and 255.

The other images that are from among the left-view and right-view images and are not the anchor pictures 151, 152, 153, 154, 155, 251, 252, 253, 254, and 255 are predicted by referring to same-view images.

However, each of the left-view and right-view images may not be predicted by referring to a preceding anchor picture in the reproducing order from among the additional-view images having a same view. That is, for the inter-prediction of a current left-view image, left-view images except for a left-view anchor picture whose reproducing order precedes the current left-view image may be referred to. Similarly, for the inter-prediction of a current right-view image, right-view images except for a right-view anchor picture whose reproducing order precedes the current right-view image may be referred to.

Also, for the inter-prediction of the current left-view image, it is preferable that prediction does not refer to a left-view image included in a previous GOP that precedes a current GOP including the current left-view image, and is performed by referring to a left-view image that is included in the current GOP and is to be reconstructed before the current left-view image. This is also applied to the right-view image.

The inter-layer video decoding apparatus 20 according to the present exemplary embodiment may reconstruct the base-view image, the left-view images, and the right-view images according to the reproducing order of the multiview video prediction structure 50 shown in FIG. 3.

The left-view images may be reconstructed via inter-view disparity compensation that refers to the base-view images, and inter-image motion compensation that refers to the left-view images. The right-view images may be reconstructed via inter-view disparity compensation that refers to the base-view images and the left-view images, and inter-image motion compensation that refers to the right-view images. For disparity compensation and motion compensation of the left-view images and the right-view images, reference images have to be first reconstructed.

For inter-image motion compensation of a left-view image, the left-view images may be reconstructed via inter-image motion compensation that refers to a reconstructed left-view reference image. For inter-image motion compensation of a right-view image, the right-view images may be reconstructed via inter-image motion compensation that refers to a reconstructed right-view reference image.

For inter-image motion compensation of the current left-view image, it is preferable that the left-view image included in the previous GOP that precedes the current GOP including the current left-view image is not referred to, and only the left-view image that is included in the current GOP and is to be reconstructed before the current left-view image is referred to. This is also applied to the right-view image.

As described above, the inter-layer video encoding apparatus 10 and the inter-layer video decoding apparatus 20 may determine whether to perform the illumination compensation, according to a characteristic of an image. Also, the inter-layer video encoding apparatus 10 and the inter-layer video decoding apparatus 20 may determine whether to perform the illumination compensation on each of slices or each of blocks.

For example, whether to perform the illumination compensation may be determined only for a skip mode block. Since a prediction error between an original block and a prediction block may be compensated for, in a non-skip mode block, by using a residual component generated as a result of the inter-layer prediction or the inter-prediction, the illumination compensation may not be performed on the non-skip mode block. On the other hand, since residual data of the skip mode block is not encoded, whether to perform the illumination compensation may be determined for the skip mode block.

For prediction encoding, a coding unit of a 2N×2N size may be split into prediction units of a 2N×2N size, an N×2N size, a 2N×N size, or an N×N size. Here, sample values of partition type information indicating a shape of the prediction units may be determined as 2N×2N, N×2N, 2N×N, and N×N. For example, whether to perform the illumination compensation may be determined only for a 2N×2N block in a merge mode (hereinafter, the 2N×2N merge block).

Also, whether to perform the illumination compensation may be determined for each of a luma block and a chroma block. For example, when the luma block is a block in a skip mode (the skip block), or a 2N×2N block in a merge mode (the 2N×2N merge block), whether to perform the illumination compensation may be determined. However, only when the chroma block is a skip block, may whether to perform the illumination compensation be determined.

As another example, whether to perform the illumination compensation may be determined for all of a luma block and a chroma block whose partition size is 2N×2N.

As another example, even if it is determined to perform the illumination compensation on a block whose partition size is 2N×2N, whether to perform the illumination compensation on a luma component and a chroma component may be differently determined, according to a size of a current partition. For example, it may be determined to perform the illumination compensation on a luma component of a block whose partition size is 8×8, and it may be determined not to perform the illumination compensation on a chroma component of the block whose partition size is 8×8.

Also, a size of a block to be illumination-compensated may vary according to a luma block and a chroma block. For example, it may be determined to perform the illumination compensation on a luma component of a block whose partition size is equal to or greater than 8×8. It may differ with respect to determining whether to perform the illumination compensation on a chroma component of the same block. In a block whose partition size of a luma component is 8×8, a partition size of a chroma component of the block may be 4×4. Therefore, the illumination compensation is not performed on the chroma component of the block if the partition size of the luma component of the block is 8×8, and the illumination compensation may be performed on a chroma component of a block if a partition size of a luma component of the block is greater than 8×8.

Also, when a current picture is not a random access point, the illumination compensation may not be performed on blocks in the current picture. That is, whether to perform the illumination compensation may be determined only for a block of the random access point.

As another example, the illumination compensation may not be performed on a chroma block of a picture that is not the random access point. Therefore, whether to perform the illumination compensation may be determined for luma/chroma blocks of a picture that is the random access point, and a luma block of the picture that is not the random access point.

As another example, whether to perform the illumination compensation on a current block may be determined, based on encoding characteristics such as a picture type of a picture including a block, a temporal level, a Network Abstraction Layer (NAL) unit type, or a distance between a current image and a reference image during temporal prediction. It is possible to preset an encoding mode having a high possibility of the illumination compensation according to encoding characteristics. Whether to perform the illumination compensation may be determined for a block having the preset encoding mode.

As another example, whether to perform the illumination compensation may be determined according to an encoding mode that is determined for each of blocks. For example, for each of slices, illumination compensation information may be transmitted to or may be received as slice data or a slice header, wherein the illumination compensation information indicates whether to perform the illumination compensation when a block of a corresponding slice indicates a predetermined encoding mode. Alternatively, for each of pictures, illumination compensation information may be transmitted or received as PPS or picture-related data, wherein the illumination compensation information indicates whether to perform the illumination compensation when a block of a corresponding picture indicates a predetermined encoding mode.

For example, whether to perform the illumination compensation on a block may be determined according to an encoding mode of the block determined according to rate-distortion (RD) optimization, a prediction direction of the block, and a coding type.

Hereinafter, with reference to FIGS. 4A through 7B, methods of determining whether to perform illumination compensation, according to exemplary embodiments, are provided.

An exemplary embodiment of determining whether to perform the illumination compensation on a skip mode or 2N×2N merge block is described with reference to FIGS. 4A, 4B, and 5, an exemplary embodiment of determining whether to perform the illumination compensation on each of luma and chroma blocks is described with reference to FIGS. 6A, 6B, and 6C, and an exemplary embodiment of selectively performing the illumination compensation and residual prediction is described with reference to FIGS. 7A and 7B.

Figure 4A:
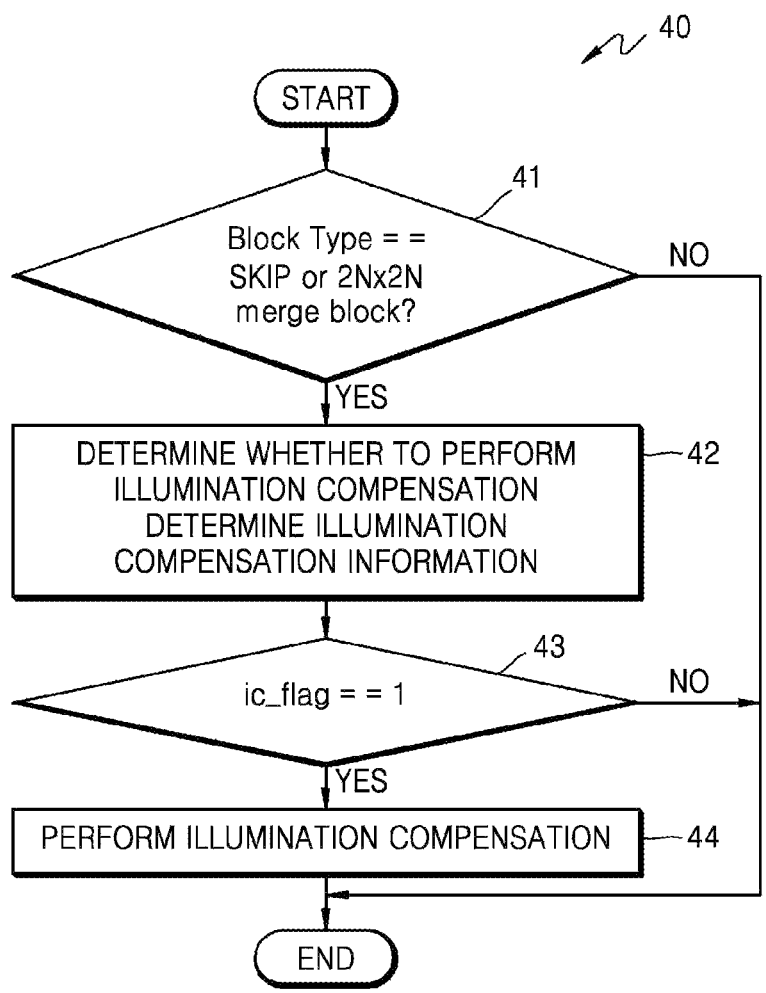
FIG. 4A illustrates a flowchart of an illumination compensating method performed by the inter-layer video encoding apparatus, according to an exemplary embodiment.

FIG. 4A illustrates a flowchart of an illumination compensating method performed by the inter-layer video encoding apparatus 10, according to an exemplary embodiment.

In operation 41, if a block type of a current block is neither a skip block nor a 2N×2N merge block, the illumination compensation determiner 14 of the inter-layer video encoding apparatus 10 may determine whether to perform illumination compensation and may end the process (40).

However, in operation 41, if the block type of the current block is the skip block or the 2N×2N merge block, in operation 42, the illumination compensation determiner 14 may determine whether to perform the illumination compensation on the current block. According to the determination, the illumination compensation determiner 14 may set illumination compensation information 'ic_flag' to the current block. The illumination compensation information 'ic_flag' that is set to the current block may be encoded and may be included in a transmission stream.

In operation 43, whether the illumination compensation information 'ic_flag' indicates 1 is determined, and in operation 44, the illumination compensation may be performed on a block that is determined to be illumination-compensated.

Figure 4B:
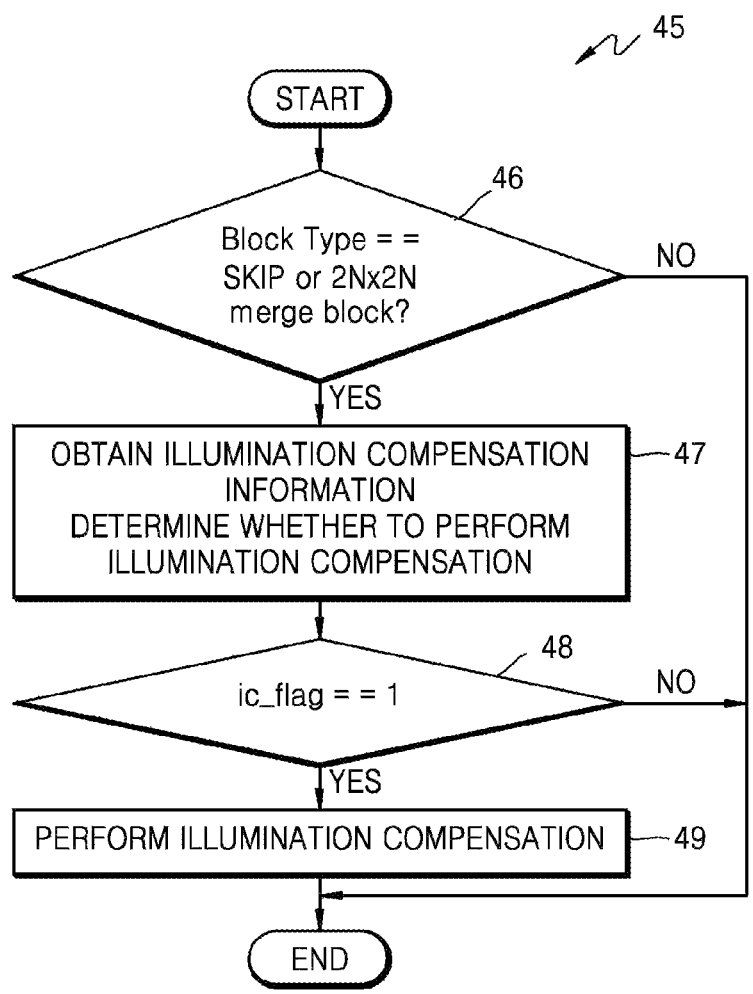
FIG. 4B illustrates a flowchart of an illumination compensating method performed by the inter-layer video decoding apparatus, according to an exemplary embodiment.

FIG. 4B illustrates a flowchart of an illumination compensating method performed by the inter-layer video decoding apparatus 20, according to an exemplary embodiment.

In operation 46, the illumination compensation determiner 24 of the inter-layer video decoding apparatus 20 may obtain block type information of a current block and may determine whether the current block is a skip block or a 2N×2N merge block. If the current block is neither the skip block nor the 2N×2N merge block, the illumination compensation determiner 24 may not determine whether to perform illumination compensation and may end the process (45).

However, in operation 46, if it is determined that a block type of the current block is the skip block or the 2N×2N merge block, in operation 47, the illumination compensation determiner 24 may obtain illumination compensation information 'ic_flag' of the current block, and may determine whether to perform the illumination compensation by referring to the illumination compensation information 'ic_flag'. The illumination compensation information 'ic_flag' of the current block may be obtained from a reception stream, or may be determined according to a coding type or a prediction direction that is an encoding mode of the current block.

In operation 48, whether the illumination compensation information 'ic_flag' indicates 1 is determined, and in operation 49, the illumination compensation may be performed on a block that is determined to be illumination-compensated.

FIG. 5 illustrates a syntax for performing illumination compensation according to a partition type and a prediction mode of a current block, according to an exemplary embodiment.

A syntax coding_unit( ) 55 for a current block may include a condition 56 for determining whether to perform illumination compensation on the current block.

That is, when the illumination compensation is enabled for blocks in a slice (icEnableFlag=1), and a partition type of a block is a 2N×2N merge block (PartMode==PART_2N×2N && merge_flag[x0][y0]) or a skip mode (skip_flag[x0][y0]), illumination compensation information 'ic_flag' may be used so as to indicate whether to perform the illumination compensation on the current block.

Figure 6A:
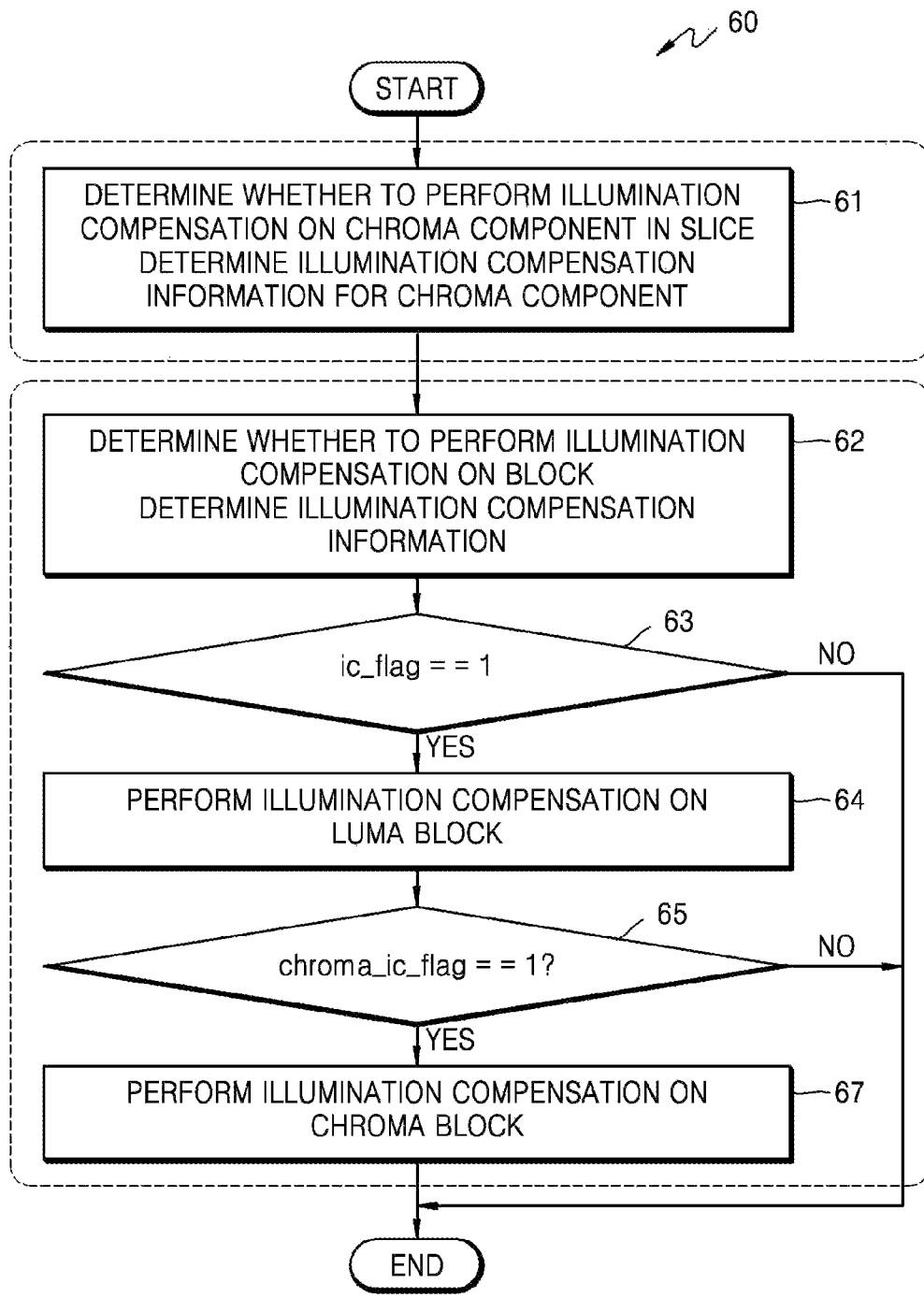
FIG. 6A illustrates a flowchart of an illumination compensating method performed by the inter-layer video encoding apparatus, according to another exemplary embodiment.

FIGS. 6A through 6C illustrate examples of determining whether to perform illumination compensation on each of luma and chroma blocks.

FIG. 6A illustrates a flowchart of an illumination compensating method performed by the inter-layer video encoding apparatus 10, according to another exemplary embodiment.

First, in operation 61, the illumination compensation determiner 14 of the inter-layer video encoding apparatus 10 may determine whether it is possible to perform illumination compensation on a chroma block in a current picture or slice, and may set illumination compensation information 'chroma_ic_flag' for the chroma block.

As described above, the illumination compensation information for the chroma block may be determined by using an encoding mode such as a picture type including a current block, an NAL unit type, a distance between an original image and a temporal reference image, etc. The illumination compensation information 'chroma_ic_flag' for the chroma block may be included in a transmission stream.

In operation 61, whether to perform the illumination compensation in a picture or slice level is determined, and in operations 62 through 66, whether to perform the illumination compensation in a block level may be determined.

If whether to perform the illumination compensation on the chroma block in the current picture or slice is determined in the previous operation, in operation 62, the illumination compensation determiner 14 may determine whether to perform the illumination compensation on each of a luma block and the chroma block. Luma illumination compensation information 'ic_flag' indicating whether it is possible to perform the illumination compensation on the luma block may be set, and chroma illumination compensation information 'chroma_ic_flag' indicating whether it is possible to perform the illumination compensation on the chroma block may be set.

In operation 63, the illumination compensation determiner 14 may determine whether the luma illumination compensation information 'ic_flag' indicates that the illumination compensation is performed on a current luma block. If the luma illumination compensation information 'ic_flag' indicates a 0 value, the illumination compensation determiner 14 may not determine whether to perform the illumination compensation and may end the process (60).

However, in operation 63, if the luma illumination compensation information 'ic_flag' indicates 1, in operation 64, the illumination compensation determiner 14 may perform the illumination compensation on the current luma block.

In operation 65, if it is determined that the chroma illumination compensation information 'chroma_ic_flag' indicates 1, in operation 66, the illumination compensation determiner 14 may perform the illumination compensation on a current chroma block.

FIG. 6B illustrates a flowchart of an illumination compensating method performed by the inter-layer video decoding apparatus 20, according to another exemplary embodiment.

First, in operation 611, the illumination compensation determiner 24 of the inter-layer video decoding apparatus 20 may obtain illumination compensation information 'chroma_ic_flag' for a chroma block. The illumination compensation information 'chroma_ic_flag' for the chroma block may be obtained from a transmission stream. As described above, the illumination compensation information for the chroma block may be determined by using an encoding mode such as a picture type including a current block, an NAL unit type, a distance between an original image and a temporal reference image, etc.

In operation 611, whether to perform the illumination compensation in a picture or slice level is determined, and in operations 621 through 671, whether to perform the illumination compensation in a block level may be determined.

If whether to perform the illumination compensation on the chroma block in the current picture or slice is determined in the previous operation, in operation 621, the illumination compensation determiner 24 may determine whether to perform the illumination compensation on each of a luma block and the chroma block. Luma illumination compensation information 'ic_flag' indicating whether it is possible to perform the illumination compensation on the luma block may be obtained, and chroma illumination compensation information 'chroma_ic_flag' indicating whether it is possible to perform the illumination compensation on the chroma block may be obtained.

In operation 631, the illumination compensation determiner 24 may determine whether the luma illumination compensation information 'ic_flag' indicates that the illumination compensation is performed on a current luma block. If the luma illumination compensation information 'ic_flag' indicates a 0 value, the illumination compensation determiner 14 may not perform determining whether to perform the illumination compensation and may end the process (601).

However, in operation 631, if the luma illumination compensation information 'ic_flag' indicates 1, in operation 641, the illumination compensation determiner 24 may perform the illumination compensation on the current luma block.

In operation 651, if it is determined that the chroma illumination compensation information 'chroma_ic_flag' indicates 1, in operation 661, the illumination compensation determiner 24 may perform the illumination compensation on a current chroma block.

FIG. 6C illustrates a syntax for performing illumination compensation according to color components, according to another exemplary embodiment.

A header slice_header 68 of a current slice may include 'slice_ic_enable_flag' indicating whether illumination compensation is enabled in a slice. When a slice including a current block is a dependent slice (dependent_slice_flag), the header slice_header 68 of the slice may include 'slice_ic_enable_flag' indicating whether the illumination compensation is enabled in the current slice.

Also, according to the 'slice_ic_enable_flag' 69 indicating whether the illumination compensation is enabled in the current slice, whether to perform the illumination compensation on a chroma block may be determined. That is, if the illumination compensation is enabled in the current slice, chroma illumination compensation information 'slice_chroma_ic_enableflag' may be used so as to indicate whether it is possible to perform the illumination compensation on the chroma block in the current slice.

If the header slice_header 68 of the current slice does not include the chroma illumination compensation information 'slice_chroma_ic_flag', the chroma illumination compensation information may be regarded as 0.

While FIG. 6C provides the present exemplary embodiment in which whether to perform the illumination compensation is determined only for the chroma block, in another exemplary embodiment, whether to perform the illumination compensation may be selectively determined for a luma block.

Hereinafter, with reference to FIGS. 7A and 7B, exemplary embodiments in which illumination compensation and residual prediction are selectively performed are described in detail.

FIGS. 7A and 7B illustrate syntaxes for determining whether to perform the illumination compensation and the residual prediction on each of blocks.

The inter-layer video encoding apparatus 10 and the inter-layer video decoding apparatus 20 according to exemplary embodiments may perform the residual prediction to perform prediction between a residual component, which is generated in a first layer via inter-prediction, and a residual component that is generated in a second layer via inter-prediction. That is, according to the residual prediction, inter-layer prediction is performed between residuals that are generated in layers via the inter-prediction, and thus a total of two prediction operations may be performed. Although encoding efficiency may be improved due to the residual prediction, since the two prediction operations have to be performed, a calculation load is also high.

When the inter-layer video encoding apparatus 10 and the inter-layer video decoding apparatus 20 according to the exemplary embodiments perform temporal-direction prediction (inter-prediction) and view-direction prediction (inter-layer prediction), illumination compensation and residual prediction may be simultaneously performed on a current block.

However, in order to decrease calculation, when it is possible to perform all of the illumination compensation and the residual prediction on the current block, an operation of one of them may not be allowed.

The inter-layer video encoding apparatus 10 and the inter-layer video decoding apparatus 20 according to the exemplary embodiments may not perform the residual prediction on a block that is enabled for the illumination compensation.

The inter-layer video encoding apparatus 10 and the inter-layer video decoding apparatus 20 according to other exemplary embodiments may not perform the illumination compensation on a block that is enabled for the residual prediction.

A block syntax coding_unit (70) according to the present exemplary embodiment includes a condition 71 for determining whether the illumination compensation is performed on a current block, and a condition 72 for determining whether to perform the residual prediction is enabled.

Therefore, when it is determined that the illumination compensation is enabled in a current slice, based on 'icEnableFlag', whether the illumination compensation is performed on the current block may be determined, based on 'ic_flag' (the condition 71). When it is determined that the residual prediction is enabled in the current slice, based on 'resPredEnableFlag', and it is determined that the illumination compensation is not performed, based on lic_flag', whether the residual prediction is performed on the current block may be determined, based on 'res_pred_flag' (the condition 72).

A block syntax coding_unit (75) according to the present exemplary embodiment includes a condition 76 for determining whether to perform the residual prediction on the current block is enabled, and a condition 77 for determining whether to perform the illumination compensation on the current block.

Therefore, when it is determined that the residual prediction is enabled in a current slice, based on 'resPredEnableFlag', it may be determined that the residual prediction is performed on the current block, based on 'res_pred_flag' (the condition 76). Also, when it is determined that the illumination compensation is enabled in the current slice, based on 'icEnableFlag', and it is determined that the residual prediction is not performed, based on lres_pred_flay, whether the illumination compensation is performed on the current block may be determined, based on 'ic_flag' (the condition 77).

With reference to FIGS. 1A through 7B, the inter-layer video encoding apparatus 10 and the inter-layer video decoding apparatus 20 to determine whether to perform the illumination compensation on a block according to characteristics of an image have been described. If the illumination compensation is performed on all blocks, a calculation load may be increased, so that whether to perform the illumination compensation is determined only for a block that satisfies a predetermined condition, and whether to perform the illumination compensation is not determined for a block that does not satisfy the predetermined condition, and the illumination compensation is not performed on the block.

Therefore, whether to perform the illumination compensation may be determined for a block that is encoded by using a preset encoding mode. Also, illumination compensation information indicating whether to perform the illumination compensation that is determined for a block having the encoding mode may be included in a transmission stream or may be obtained from a reception stream.

Therefore, according to the inter-layer video encoding apparatus 10 and the inter-layer video decoding apparatus 20 according to exemplary embodiments, whether to perform the illumination compensation is determined only for a block that relatively more requires the illumination compensation, and the illumination compensation is not performed on other blocks, so that an increase in a calculation load due to the illumination compensation may be decreased, and coding efficiency due to the illumination compensation may be improved.

As described above, the inter-layer video encoding apparatus 10 and the inter-layer video decoding apparatus 20 according to the exemplary embodiments split blocks of divided video data into coding units of a tree structure, and encoding units, prediction units, and transformation units are used for inter-layer prediction or inter-prediction of the coding unit. Hereinafter, with reference to FIGS. 8 through 20, a video encoding method and apparatus therefor, and a video decoding method and apparatus therefor, based on coding units and transformation units of a tree structure, are described.

Basically, in an encoding/decoding procedure for a multilayer video, an encoding/decoding procedure for first layer images, and an encoding/decoding procedure for second layer images are separately performed. That is, when inter-layer prediction occurs in the multilayer video, encoding/decoding results of a single layer video may be mutually referred to, but an encoding/decoding procedure is performed for each of single layer videos.

Therefore, for convenience of description, a video encoding procedure and a video decoding procedure based on coding units of a tree structure that are described layer with reference to FIGS. 8 through 20 are a video encoding procedure and a video decoding procedure for a single layer video, thus, inter-prediction and motion compensation are described in detail. However, as described above with reference to FIGS. 1A through 7B, for encoding/decoding a video stream, inter-layer prediction and compensation between base-view images and second layer images are performed.

Figure 8:
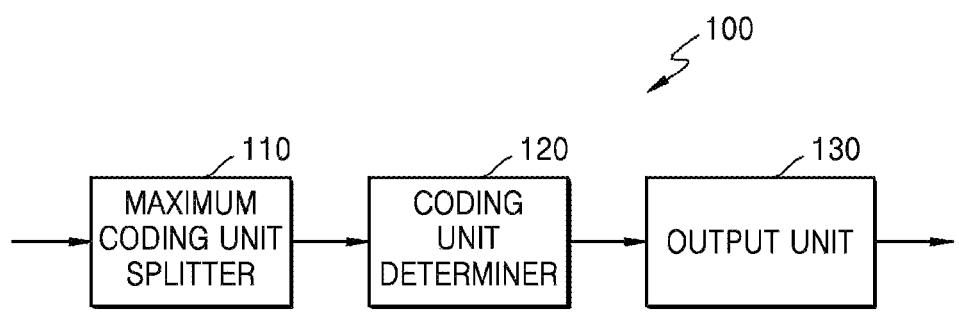
FIG. 8 is a block diagram of a video encoding apparatus based on coding units of a tree structure, according to an exemplary embodiment.

Therefore, in order for the first layer encoder 12 of the inter-layer video encoding apparatus 10 to encode a multilayer video, based on coding units of a tree structure, the first layer encoder 12 may include video encoding apparatuses 100 of FIG. 8 corresponding to the number of layers of a multilayer video so as to perform video encoding on each of single layer videos, and may control the video encoding apparatuses 100 to encode the single layer videos, respectively. Also, the inter-layer video encoding apparatus 10 may perform inter-view prediction by using encoding results with respect to discrete single views obtained by the video encoding apparatuses 100. Accordingly, the first layer encoder 12 of the inter-layer video encoding apparatus 10 may generate a base-view video stream and a second layer video stream that include an encoding result of each layer.

Figure 9:
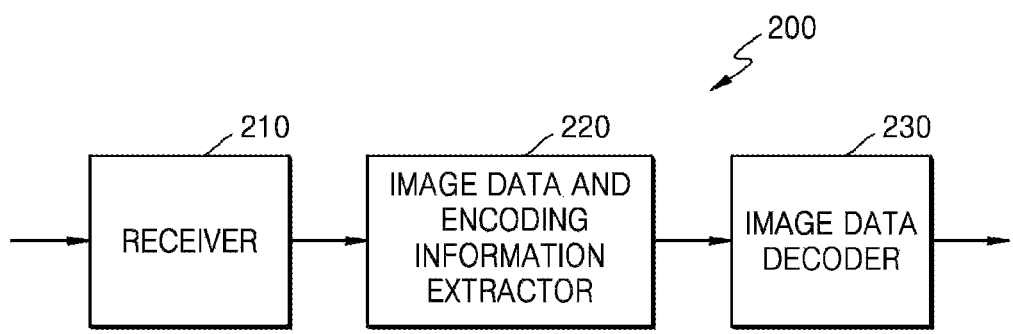
FIG. 9 is a block diagram of a video decoding apparatus based on coding units of a tree structure, according to an exemplary embodiment.

Similarly, in order for the second layer decoder 26 of the inter-layer video decoding apparatus 20 to decode a multilayer video, based on coding units of a tree structure, the second layer decoder 26 may include video decoding apparatuses 200 of FIG. 9 corresponding to the number of layers of a multilayer video so as to perform video decoding on each of layers of a received first layer video stream and a received second layer video stream, and may control the video decoding apparatuses 200 to decode single layer videos, respectively. Then, the inter-layer video decoding apparatus 20 may perform inter-layer compensation by using decoding results with respect to discrete single layers obtained by the video decoding apparatuses 200. Accordingly, the second layer decoder 26 of the inter-layer video decoding apparatus 20 may generate first layer images and second layer images that are reconstructed for each of the layers.

FIG. 8 is a block diagram of a video encoding apparatus based on coding units of a tree structure 100, according to an exemplary embodiment.

The video encoding apparatus involving video prediction based on coding units of the tree structure 100 includes a maximum coding unit splitter 110, a coding unit determiner 120 and an output unit 130 (e.g., an output, etc.). Hereinafter, for convenience of description, the video encoding apparatus involving video prediction based on coding units of the tree structure 100 is referred as 'video encoding apparatus 100'.

The maximum coding unit splitter 110 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth increases. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to exemplary embodiments, will be described in detail later with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit according to an embodiment may be a maximum square data unit that may be included in all of the coding units, prediction units, partition units, and transformation units included in the maximum coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information that are related to prediction.

According to the simplest embodiment for the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a related art macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include the video encoding apparatuses 100 corresponding to the number of layers so as to encode single layer images in each of the layers of a multilayer video. For example, the first layer encoder 12 may include one video encoding apparatus 100, and the second layer encoder 16 may include the video encoding apparatuses 100 corresponding to the number of second layers.

When the video encoding apparatuses 100 encode first layer images, the coding unit determiner 120 may determine a prediction unit for inter-image prediction for each of coding units of a tree structure according to each maximum coding unit, and may perform the inter-image prediction on each prediction unit.

When the video encoding apparatuses 100 encode second layer images, the coding unit determiner 120 may determine prediction units and coding units of a tree structure according to each maximum coding unit, and may perform inter-prediction on each of the prediction units.

The video encoding apparatus 100 may encode an illumination difference so as to compensate for the illumination difference between a first layer image and a second layer image. However, whether to perform illumination compensation may be determined according to an encoding mode of a coding unit. For example, illumination compensation may be performed only on a prediction unit having a size of 2N×2N.

FIG. 9 is a block diagram of a video decoding apparatus based on coding units of a tree structure 200, according to an exemplary embodiment.

The video decoding apparatus involving video prediction based on coding units of the tree structure 200 includes a receiver 210, an image data and encoding information extractor 220, and an image data decoder 230. Hereinafter, for convenience of description, the video decoding apparatus involving video prediction based on coding units of the tree structure 200 is referred as ' video decoding apparatus 200'.

Definitions of various terms, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may reconstruct an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 reconstructs the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial domain of the coding unit may be reconstructed.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The inter-layer video decoding apparatus 20 described above with reference to FIG. 2A may include the video decoding apparatuses 200 corresponding to the number of views, so as to decode a received first layer image stream and a received second layer image stream and to reconstruct first layer images and second layer images.

When the first layer image stream is received, the image data decoder 230 of the video decoding apparatus 200 may split samples of the first layer images, which are extracted from the first layer image stream by an extractor 220, into coding units according to a tree structure of a maximum coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a maximum coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to an illumination difference so as to compensate for the illumination difference between the first layer image and the second layer image. However, whether to perform illumination compensation may be determined according to an encoding mode of a coding unit. For example, illumination compensation may be performed only on a prediction unit having a size of 2N×2N.

Thus, the video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using information about an optimum encoding mode received from an encoder.

Figure 10:
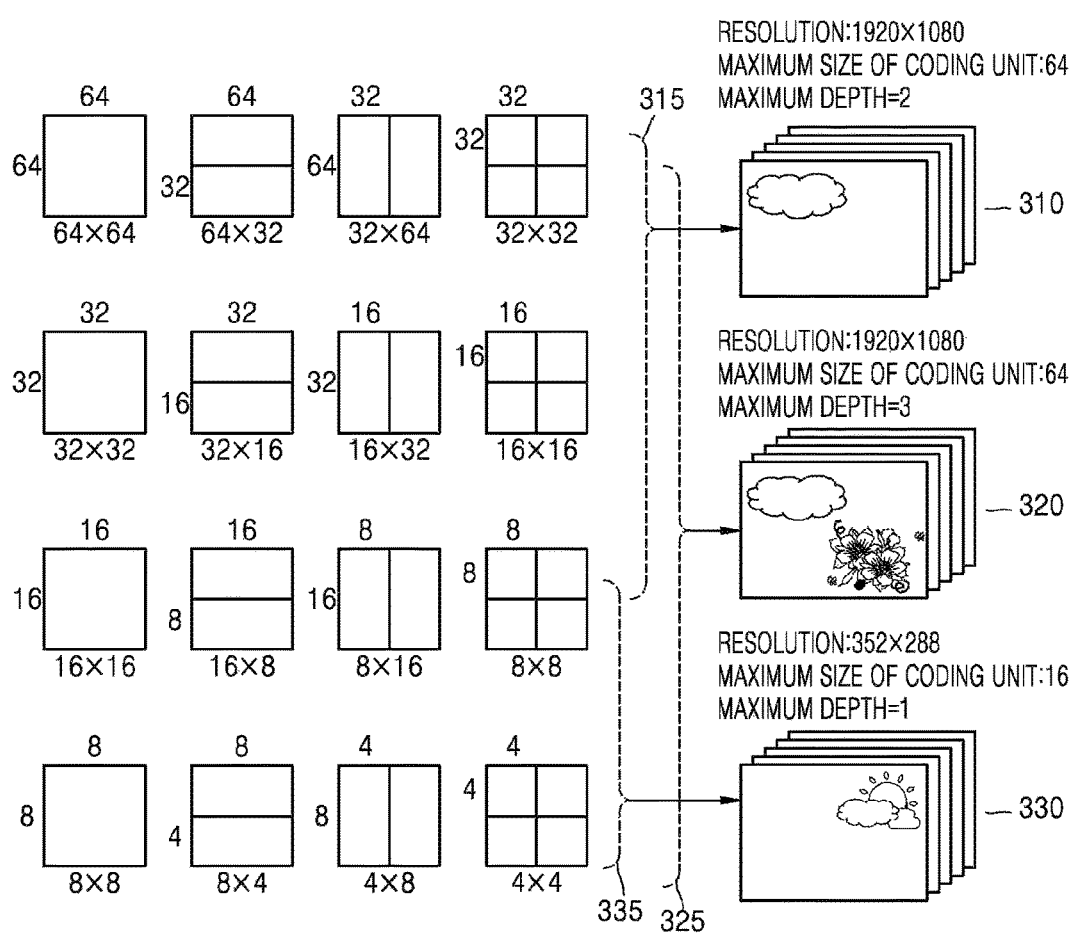
FIG. 10 is a diagram for describing a concept of coding units according to exemplary embodiments.

FIG. 10 is a diagram for describing a concept of coding units according to exemplary embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoder.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are increased to two layers by splitting the maximum coding unit twice. On the other hand, since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be precisely expressed.

Figure 11:
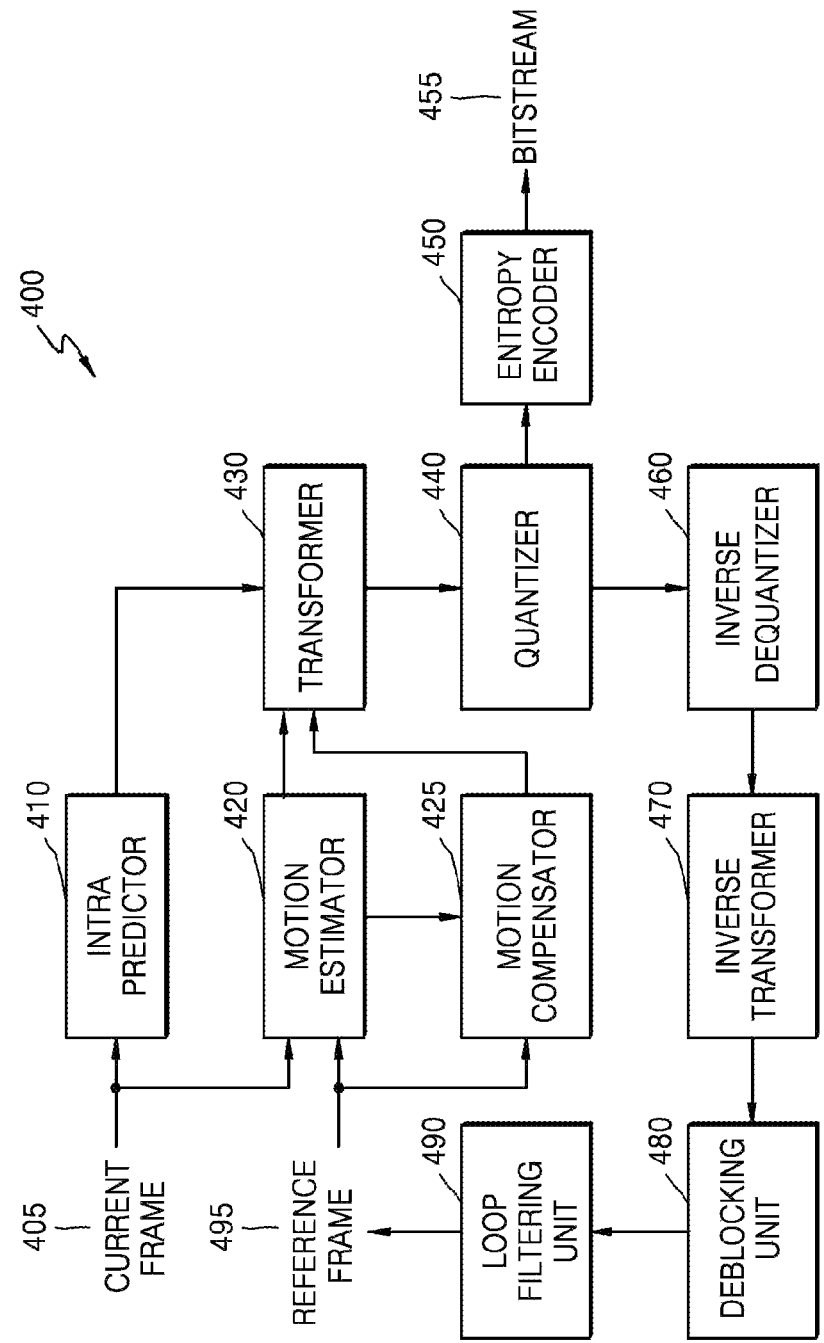
FIG. 11 is a block diagram of an image encoder based on coding units, according to exemplary embodiments.

FIG. 11 is a block diagram of an image encoder 400 based on coding units, according to exemplary embodiments.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse quantizer 460 and an inverse transformer 470, and the reconstructed data in the spatial domain is output as the reference frame 495 after being post-processed through a deblocking unit 480 and an offset compensating unit 490 (e.g. a loop filtering unit, etc.). The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the offset compensating unit 490 perform operations based on each coding unit among coding units having a tree structure while the maximum depth of each maximum coding unit is considered.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 12:
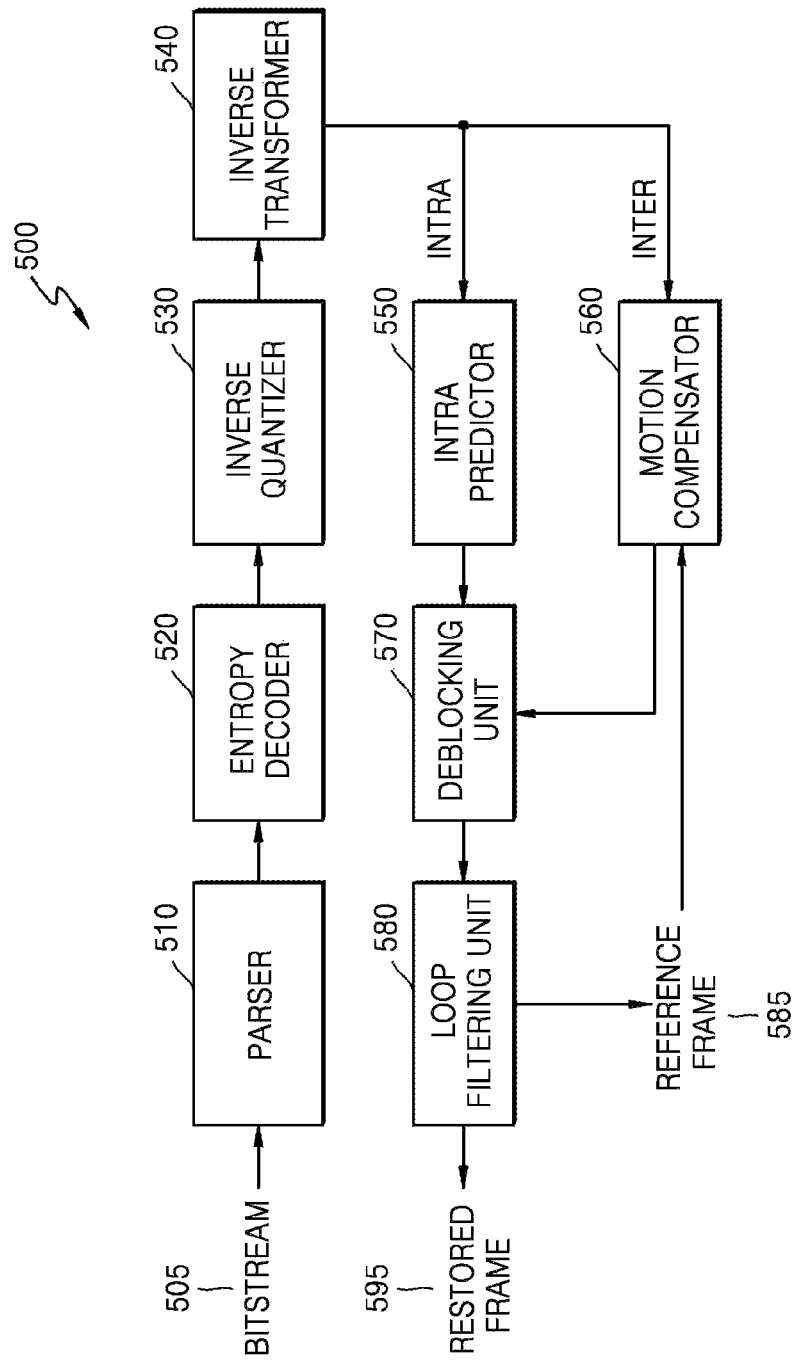
FIG. 12 is a block diagram of an image decoder based on coding units, according to exemplary embodiments.

FIG. 12 is a block diagram of an image decoder 500 based on coding units, according to exemplary embodiments.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a reconstructed frame 595 after being post-processed through a deblocking unit 570 and an offset compensating unit 580 (e.g., a loop filterer, etc.). Also, the image data that is post-processed through the deblocking unit 570 and the offset compensating unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the offset compensating unit 580 perform operations based on coding units having a tree structure for each maximum coding unit.

In particular, the intra predictor 550 and the motion compensator 560 have to determine partitions and a prediction mode for each of the coding units having a tree structure, and the inverse transformer 540 have to determine a size of a transformation unit for each coding unit.

The encoding operation of FIG. 11 and the decoding operation of FIG. 12 are described as a video stream encoding operation and a video stream decoding operation, respectively, in a single layer. Therefore, if the first layer encoder 12 of FIG. 1A encodes a video stream having at least two layers, the first layer encoder 12 may include the image encoder 400 for each of layers. Similarly, if the second layer decoder 26 of FIG. 2A decodes a video stream having at least two layers, the second layer decoder 26 may include the image decoder 500 for each of layers.

Figure 13:
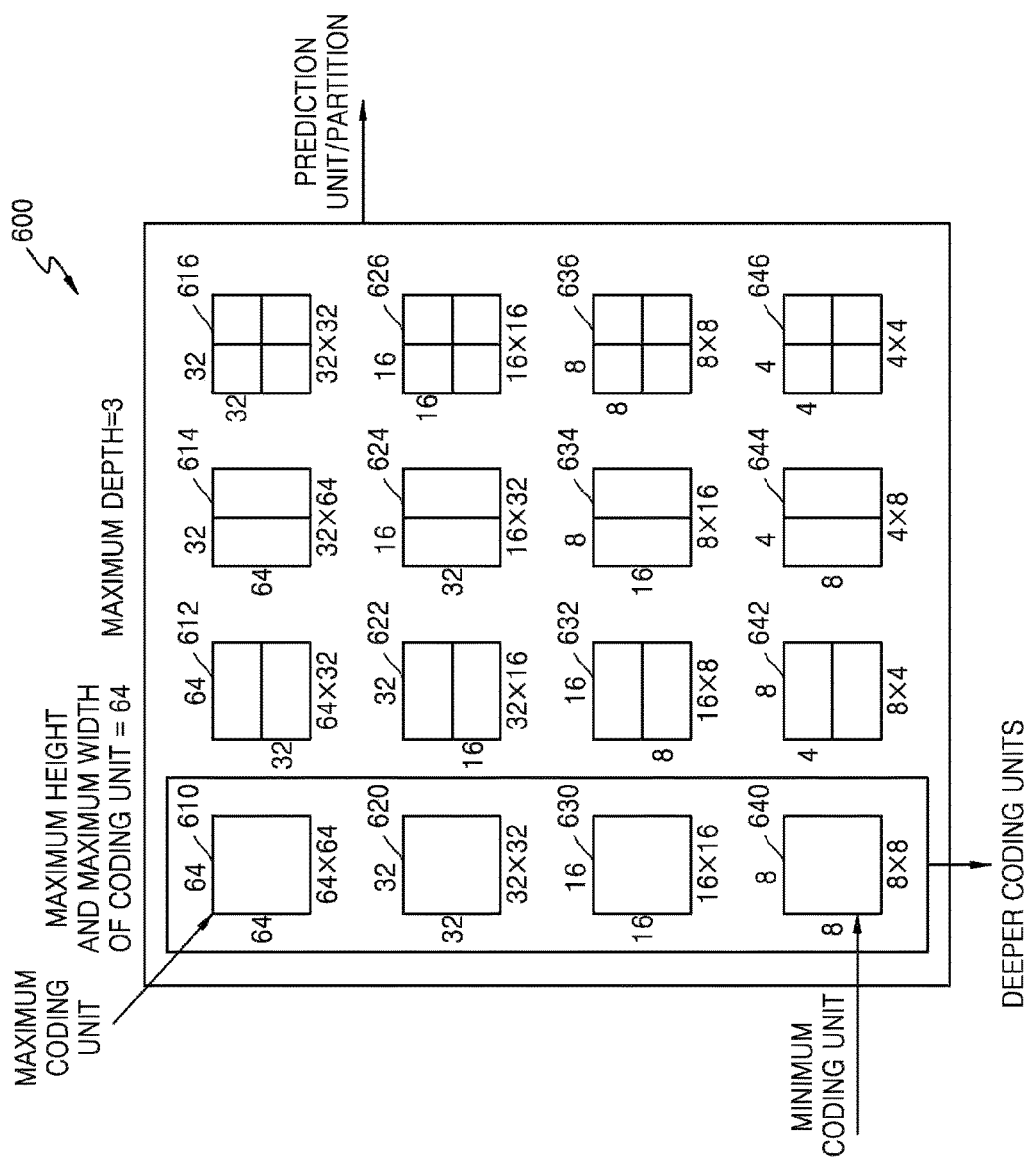
FIG. 13 is a diagram illustrating deeper coding units according to depths, and partitions, according to exemplary embodiments.

FIG. 13 is a diagram illustrating deeper coding units according to depths, and partitions, according to exemplary embodiments.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth refers to a total number of times the coding unit is split from the maximum coding unit to the minimum coding unit. Since a depth increases along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a minimum coding unit.

The prediction unit and the partitions of a coding unit are arranged along the horizontal axis according to each depth.

In other words, if the coding unit 610 having a size of 64×64 and a depth of 0 is a prediction unit, the prediction unit may be split into partitions include in the encoder 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 600. Alternatively, the minimum encoding error may be searched for by comparing representative encoding errors according to depths, by performing encoding for each depth as the depth increases along the vertical axis of the hierarchical structure 600. A depth and a partition having the minimum encoding error in the coding unit 610 may be selected as the coded depth and a partition type of the coding unit 610.

FIG. 14 is a diagram for describing a relationship between a coding unit 710 and transformation units 720, according to exemplary embodiments.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 illustrates a plurality of pieces of encoding information according to depths, according to exemplary embodiments.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode The information about the partition type 800 may indicate a 2N×2N partition 802, a 2N×N partition 804, an N×2N partition 806, or an N×N partition 808.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 16:
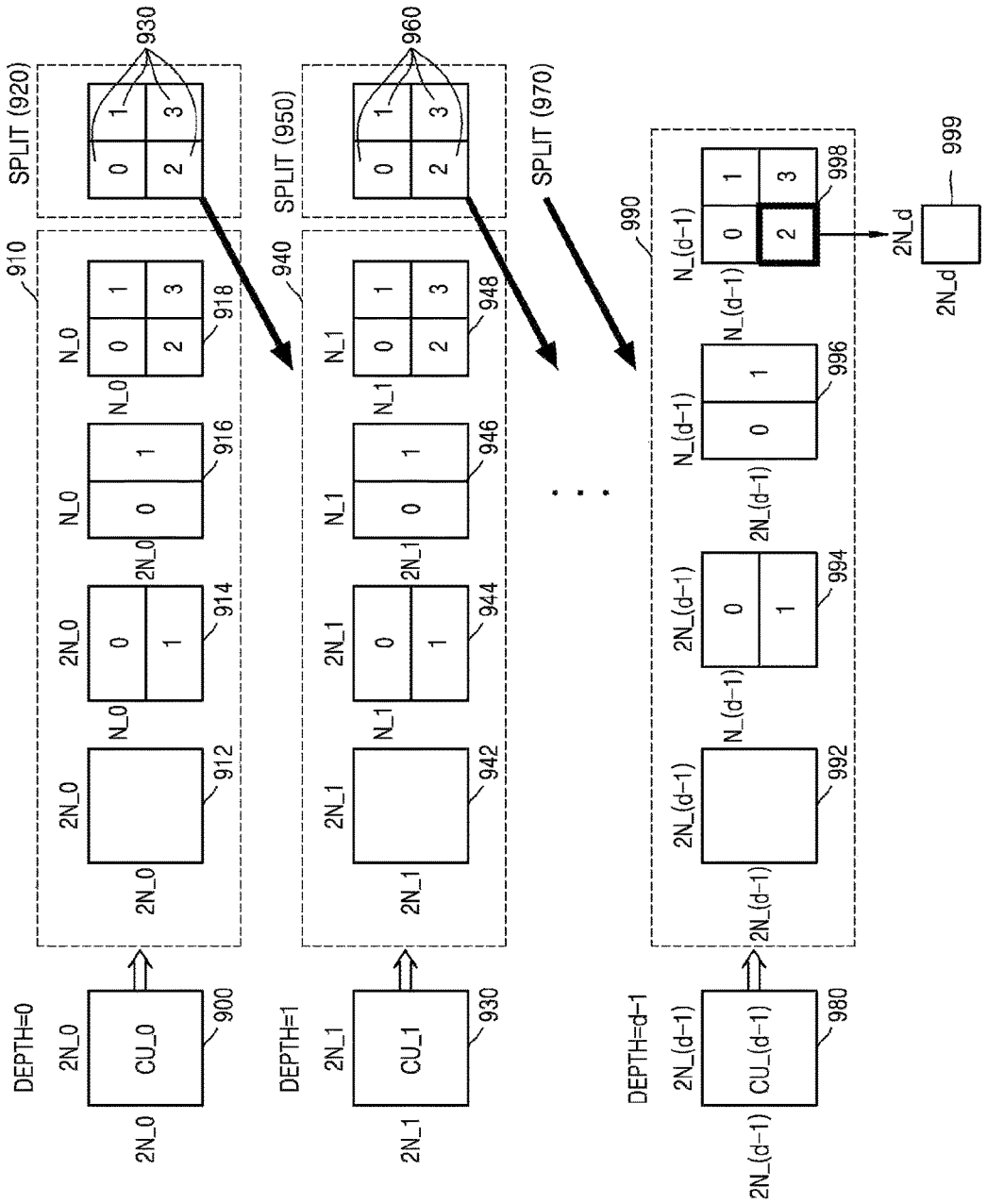
FIG. 16 is a diagram of deeper coding units according to depths, according to exemplary embodiments.

FIG. 16 is a diagram of deeper coding units according to depths, according to exemplary embodiments.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1 xN_1, a partition type 946 having a size of N_1×2N_1, and a partition type 948 having a size of N_1 xN_1.

If an encoding error is the smallest in the partition type 948 having the size of N_1 xN_1, a depth is changed from 1 to 2 to split the partition type 948 in operation 950, and encoding is repeatedly performed on coding units 960, which have a depth of 2 and a size of N_2 xN_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d, split information for the minimum coding unit 980 is not set.

A data unit 999 may be a 'minimum unit' for the current maximum coding unit. A minimum unit according to the present embodiment may be a square data unit obtained by splitting a minimum coding unit 980 having a lowermost coded depth by 4. By performing the encoding repeatedly, the video encoding apparatus 100 according to the present embodiment may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0, 1, . . . , d−1, d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 according to the present embodiment may extract and use the information about the coded depth and the prediction unit of the coding unit 900 to decode the partition 912. The video decoding apparatus 200 according to the present embodiment may determine a depth, in which split information is 0, as a coded depth by using split information according to depths, and use information about an encoding mode of the corresponding depth for decoding.

Figure 17:
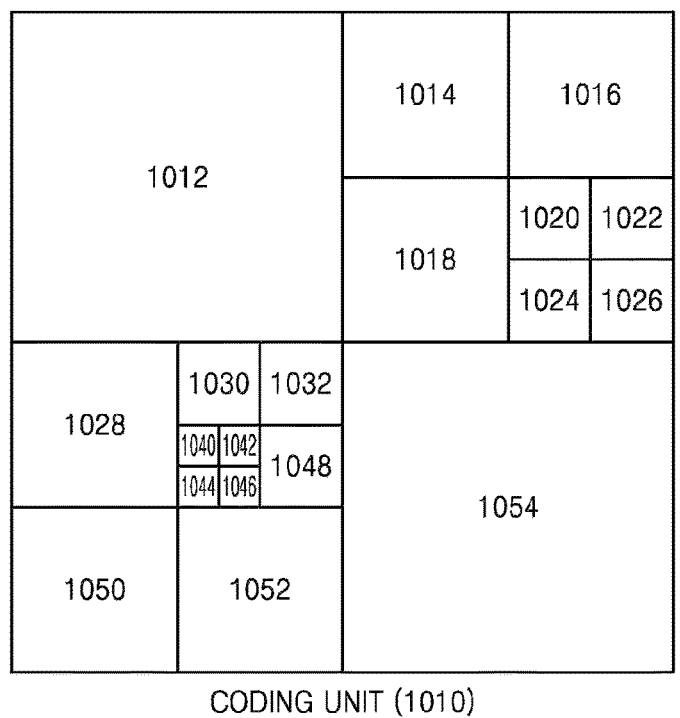
FIGS. 17, 18, and 19 are diagrams for describing a relationship between coding units, prediction units, and transformation units, according to exemplary embodiments.
Figure 18:
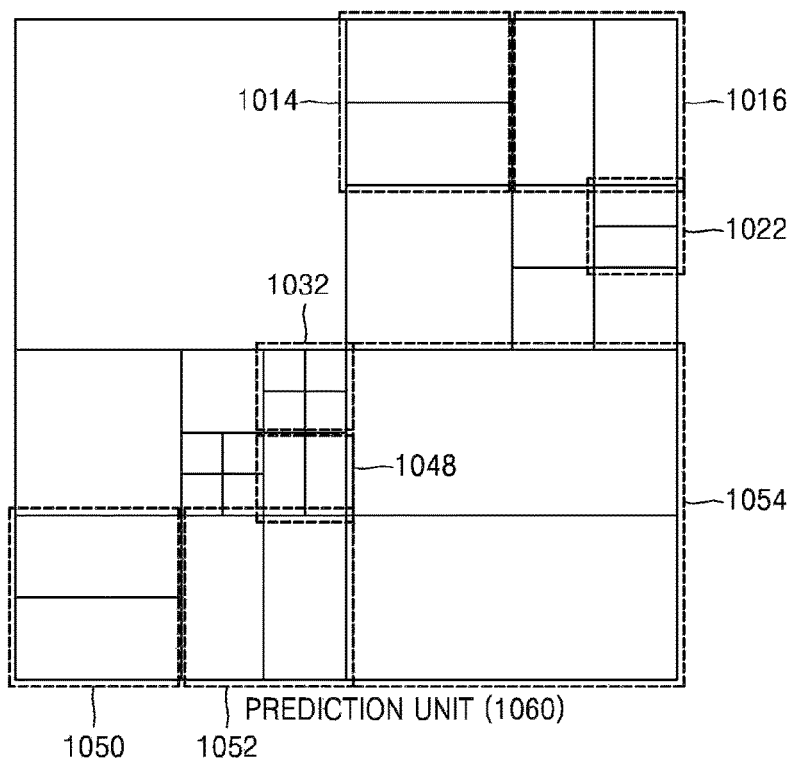
Figure 19:
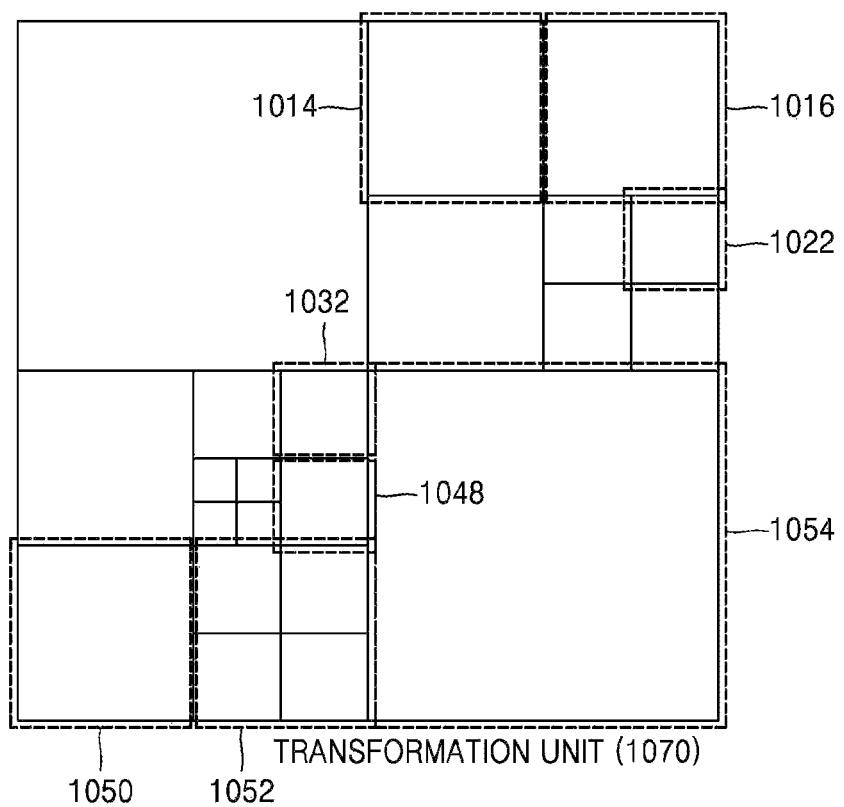

FIGS. 17, 18, and 19 are diagrams for describing a relationship between coding units 1010, prediction units 1060, and transformation units 1070, according to exemplary embodiments.

The coding units 1010 are deeper coding units according to depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoders 1014, 1016, 1022, 1032, 1048, 1050, 1052, and 1054 are obtained by splitting the coding units in the encoders 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding apparatus 100 according to the embodiment and the video decoding apparatus 200 according to the embodiment may perform intra prediction/motion estimation/motion compensation/and transformation/inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to the embodiment and the video decoding apparatus 200 according to the embodiment.

TABLE 1

Split Information 0
(Encoding on Coding Unit having Size of 2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to the embodiment may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
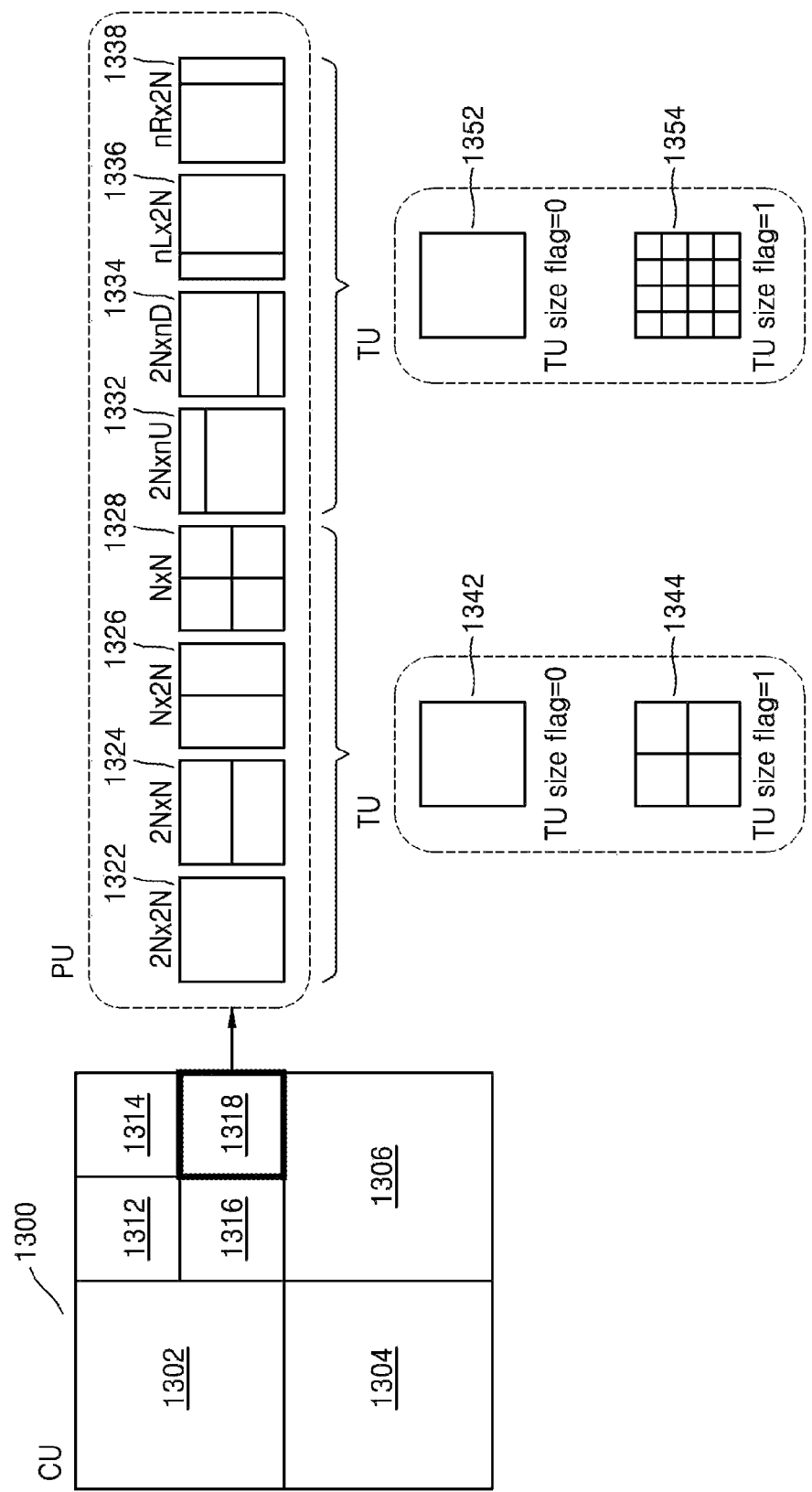
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of partition types including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index. A size of a transformation unit corresponding to the transformation index may be changed according to a prediction unit type or partition type of the coding unit.

For example, when the information about the partition type is set to be one of symmetrical partition types 2N×2N 1322, 2N×N 1324, N×2N 1326, and N×N 1328, a transformation unit 1342 having a size of 2N×2N is set if the transformation unit split information is 0, and a transformation unit 1344 having a size of N×N is set if the transformation unit split information is 1.

When the information about the partition type is set to be one of asymmetrical partition types 2N×nU 1332, 2N×nD 1334, nL×2N 1336, and nR×2N 1338, a transformation unit

1352 having a size of 2N×2N is set if the transformation unit split information is 0, and a transformation unit 1354 having a size of N/2×N/2 is set if the transformation unit split information is 1.

As described above with reference to FIG. 20, the transformation unit split information (TU size flag) is a flag having a value or 0 or 1, but the transformation unit split information is not limited to a flag having 1 bit, and the transformation unit may be hierarchically split while the transformation unit split information increases from 0. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment is capable of encoding maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an exemplary embodiment is not limited thereto.

According to the video encoding method based on coding units of a tree structure described above with reference to FIGS. 8 through 20, image data in a spatial domain is encoded in each of the coding units of the tree structure, and the image data in the spatial domain is reconstructed in a manner that decoding is performed on each maximum coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

For convenience of description, the inter-layer video encoding methods and/or the video encoding method, which are described with reference to FIGS. 1A through 20, will be collectively referred to as 'the video encoding method'. Also, the inter-layer video decoding methods and/or the video decoding method, which are described with reference to FIGS. 1A through 20, will be collectively referred to as 'the video decoding method'.

Also, a video encoding apparatus including the inter-layer video encoding apparatus 10, the video encoding apparatus 100, or the image encoder 400, which is described with reference to FIGS. 1A through 20, will be collectively referred as a 'video encoding apparatus'. Also, a video decoding apparatus including the inter-layer video encoding apparatus 20, the video decoding apparatus 200, or the image decoder 500, which is described with reference to FIGS. 1A through 20, will be referred to as a 'video decoding apparatus'.

A computer-readable recording medium storing a program, e.g., a disc 26000, according to an exemplary embodiment will now be described in detail.

Figure 21:
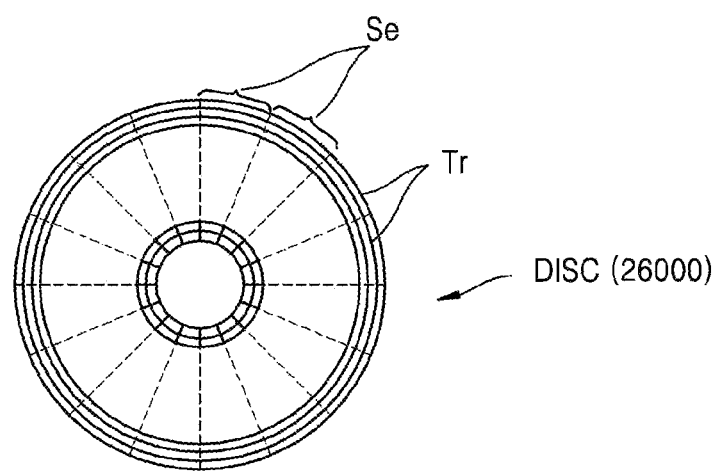
FIG. 21 is a diagram of a physical structure of a disc in which a program is stored, according to an exemplary embodiment.

FIG. 21 is a diagram of a physical structure of the disc 26000 in which a program is stored, according to an exemplary embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
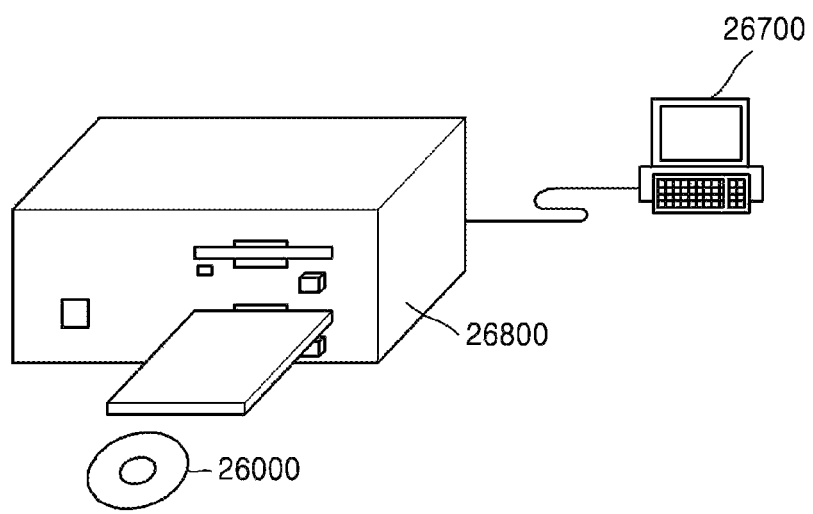
FIG. 22 is a diagram of a disc drive for recording and reading a program by using the disc.

FIG. 22 is a diagram of a disc drive 26800 for recording and reading a program by using the disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to an exemplary embodiment may be stored not only in the disc 26000 illustrated in FIGS. 21 and 22 but also may be stored in a memory card, a ROM cassette, or a solid state drive (SSD).

A system to which the video encoding method and a video decoding method described above are applied will be described below.

Figure 23:
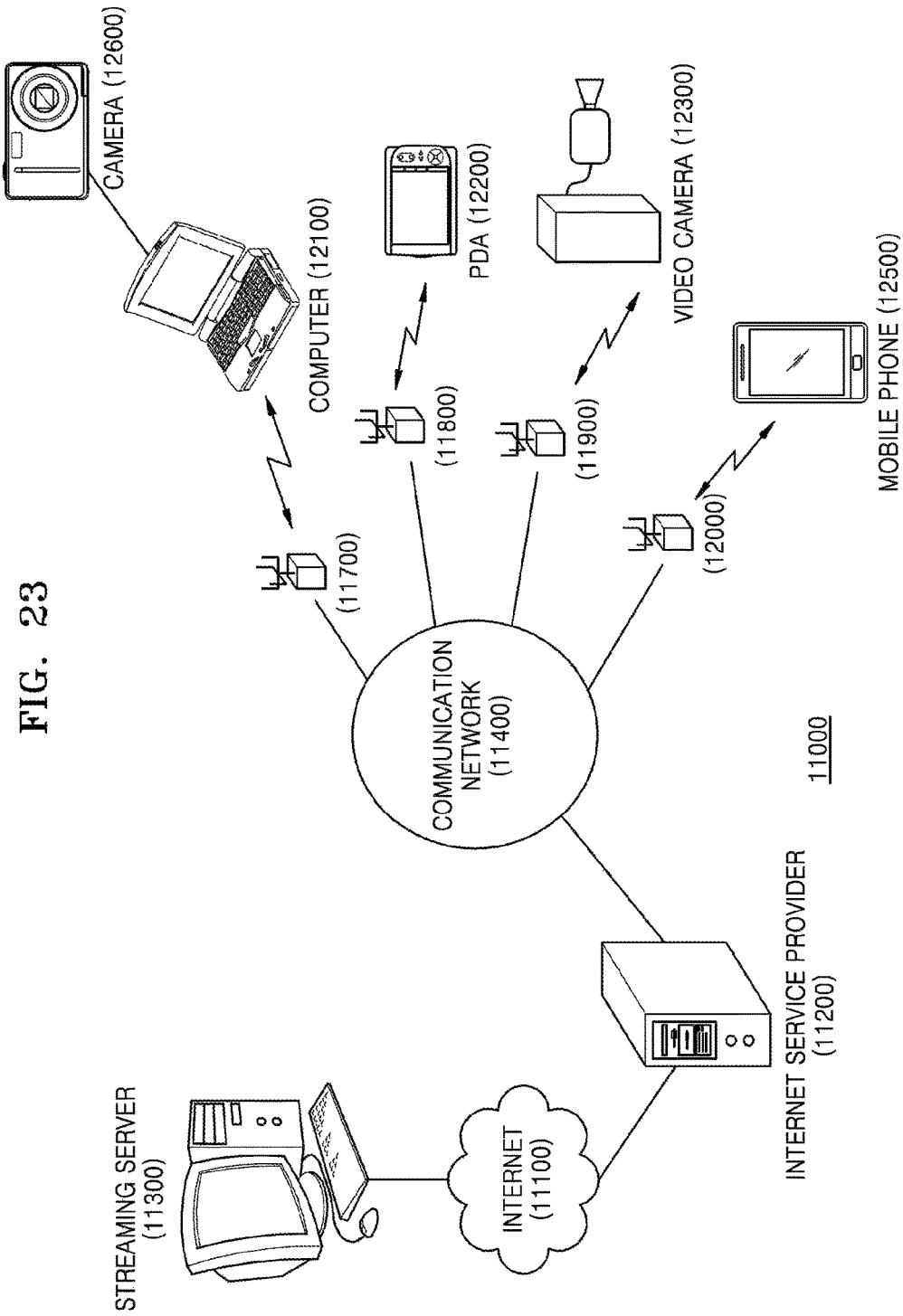
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with referring to FIGS. 24 and 25.

Figure 24:
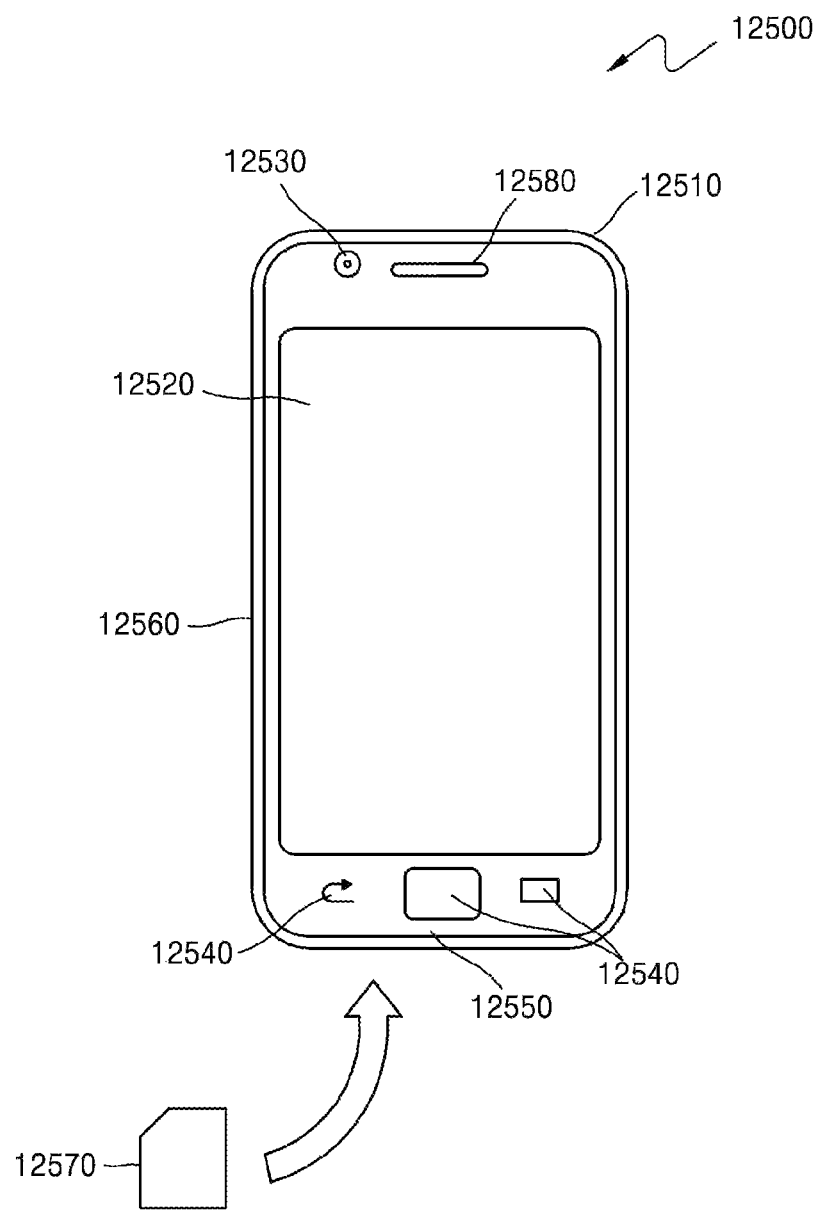
FIGS. 24 and 25 illustrate an external structure and an internal structure of a mobile phone to which a video encoding method and a video decoding method are applied, according to exemplary embodiments.

FIG. 24 illustrates an external structure of the mobile phone 12500 to which a video encoding method and a video decoding method are applied, according to an exemplary embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
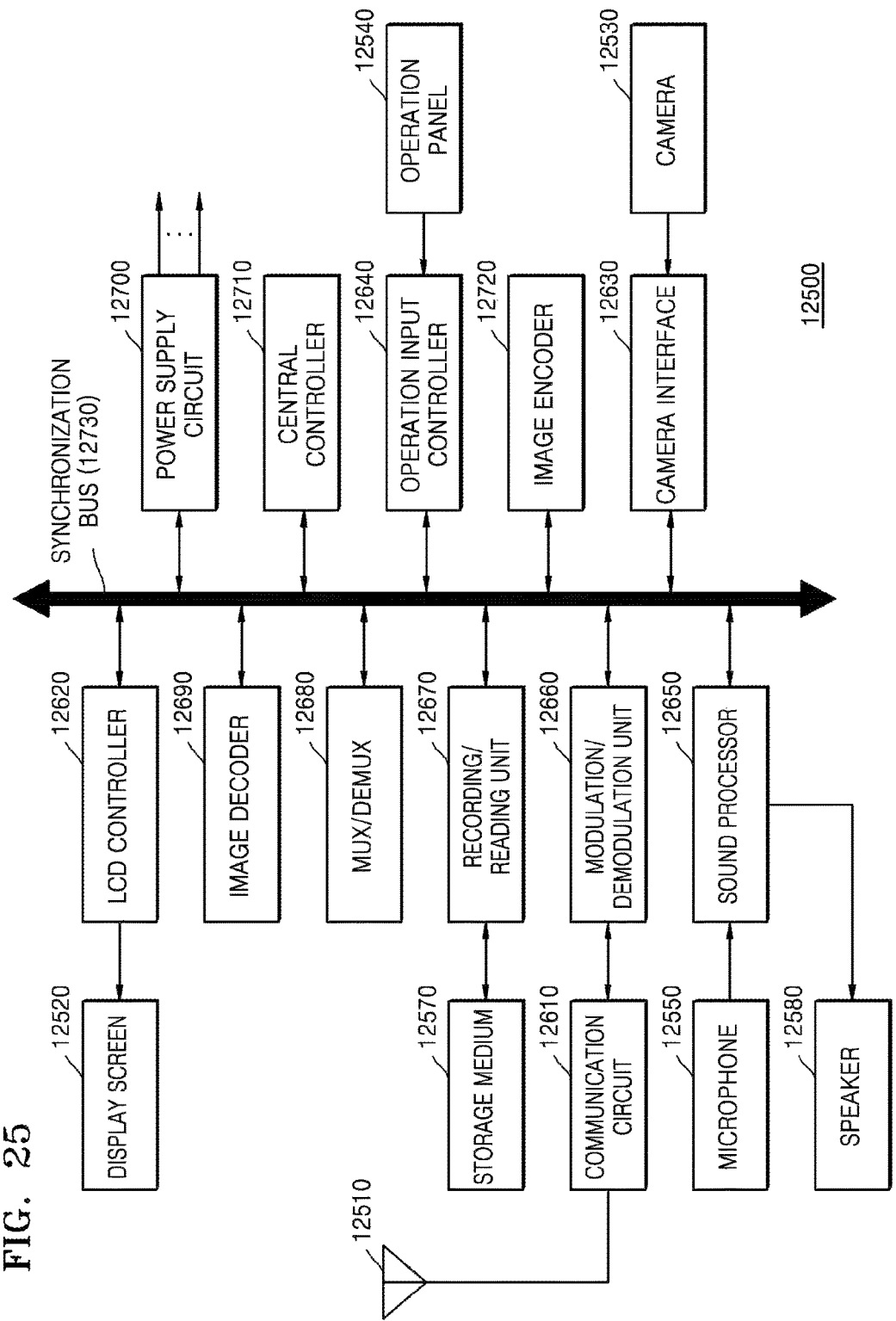

FIG. 25 illustrates an internal structure of the mobile phone 12500. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 during an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

To transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method according to the present embodiment, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the present embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment may be a transceiving terminal including only the video encoding apparatus, or may be a transceiving terminal including only the video decoding apparatus.

Figure 26:
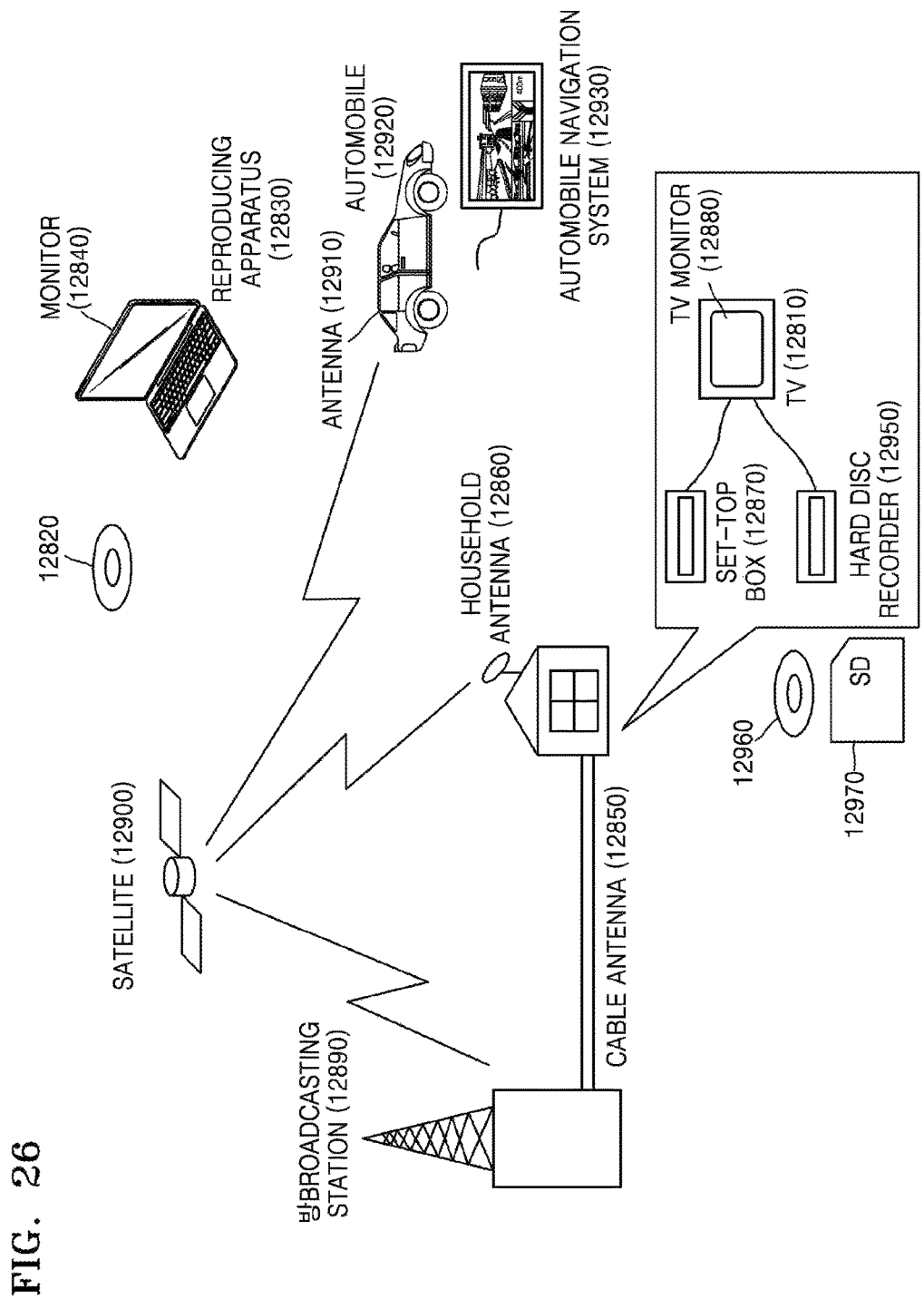
FIG. 26 illustrates a digital broadcasting system employing a communication system, according to an exemplary embodiment.

A communication system according to the exemplary embodiments is not limited to the communication system described above with reference to FIG. 24. For example, FIG. 26 illustrates a digital broadcasting system employing a communication system, according to an exemplary embodiment. The digital broadcasting system of FIG. 26 may receive a digital broadcast transmitted via a satellite or a terrestrial network by using a video encoding apparatus and a video decoding apparatus according to an exemplary embodiment.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may not be included in the camera 12530, the camera interface 12630, and the image encoder 12720 of FIG. 26.

Figure 27:
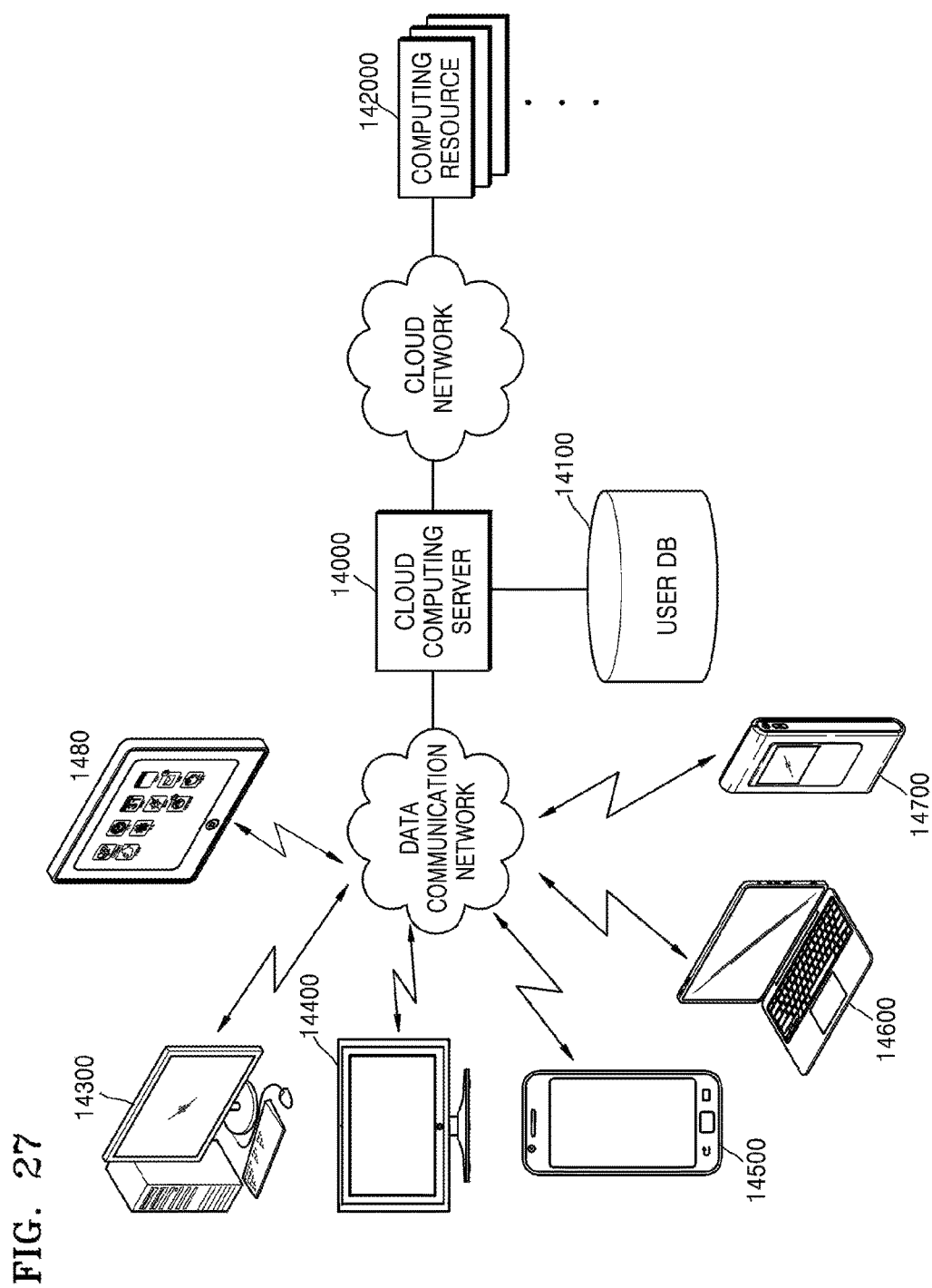
FIG. 27 is a diagram illustrating a network structure of a cloud computing system using a video encoding apparatus and a video decoding apparatus, according to an exemplary embodiment.

FIG. 27 is a diagram illustrating a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 1480, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIGS. 30 and 31.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A through 20. In another example, the user terminal may include a video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to embodiments described above with reference to FIGS. 1A through 20 are described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20, according to various embodiments, are not limited to the embodiments described above with reference to FIGS. 21 through 27.

While this disclosure has been particularly shown and described with reference to exemplary embodiments thereof, it will be understood by those of ordinary skill in the art that various changes in form and details may be made therein without departing from the spirit and scope of the following claims. The exemplary embodiments should be considered in a descriptive sense only and not for purposes of limitation. Therefore, the scope of the disclosure is defined not by the detailed description of the disclosure but by the appended claims, and all differences within the scope will be construed as being included in the disclosure.

The invention claimed is:

1. An inter-layer video decoding method comprising:
reconstructing a first layer image, based on encoding information obtained from a first layer bitstream;
in response to determining that a predetermined partition type of a second layer block is a predetermined type and a prediction mode of a second layer block is not a predetermined prediction mode, obtaining illumination compensation information for the second layer block from a second layer bitstream;
decoding the second layer block based on first layer reference block that is from among the reconstructed first layer image and corresponds to the second layer block, by using inter-layer prediction information obtained from the second layer bitstream; and
in response to determining that the illumination compensation information indicates that illumination compensation is performed for the second layer block, generating a reconstructed second layer block by compensating illumination of the second layer block.

2. The inter-layer video decoding method of claim 1, wherein the obtaining of the illumination compensation information comprises:
obtaining partition type information and prediction mode information of the second layer block from the second layer bitstream; and
if the partition type information indicates 2N×2N partition type and the prediction mode information does not indicate an intra-prediction mode, obtaining illumination compensation information for the second layer block from the second layer bitstream.

3. The inter-layer video decoding method of claim 2, wherein the obtaining of the illumination compensation information comprises obtaining, based on the partition type information and the prediction mode information, the illumination compensation information for a block that is determined to be in a skip mode or a 2N×2N merge mode.

4. The inter-layer video decoding method of claim 1, wherein the generating of a reconstructed second layer block comprises determining whether to perform the illumination compensation on a luma component and a chroma component of the second layer block to be illumination-compensated, according to a size of a current partition of the reconstructed second layer block.

5. The inter-layer video decoding method of claim 4, wherein the determining comprises determining to perform the illumination compensation on a luma component of a block whose partition size is 8×8, and determining not to perform the illumination compensation on a chroma component of the block whose partition size is 8×8.

6. The inter-layer video decoding method of claim 1, wherein the generating of a reconstructed second layer block comprises differing with respect to determining whether to perform the illumination compensation on a luma component and a chroma component of the reconstructed second layer block, according to a size of the reconstructed second layer block.

7. The inter-layer video decoding method of claim 6, wherein the generating of a reconstructed second layer block comprises determining to perform the illumination compensation on a luma component of a block when a size of a luma partition of the block is equal to or greater than 8×8, and determining to perform the illumination compensation on a chroma component of a block if a size of a luma partition of the block is greater than 8×8.

8. The inter-layer video decoding method of claim 1, wherein the generating of a reconstructed second layer block is skipped for other second layer blocks, except for the second layer block determined as the predetermined partition type and to be in the prediction mode, and the illumination compensation is not performed on the other second layer blocks.

9. The inter-layer video decoding method of claim 1, wherein, when illumination-compensation is determined to be performed on the second layer block, residual prediction is not performed on the second layer block to predict residual information of the second layer block by using residual information of at least one reference block of a temporal-direction reference block and an inter-layer direction reference block.

10. The inter-layer video decoding method of claim 1, wherein, when residual prediction is determined to be performed on the second layer block to predict residual information of the second layer block by using residual information of at least one reference block of a temporal-direction reference block and an inter-layer direction reference block, the illumination compensation is not performed on the second layer block.

11. A non-transitory computer-readable recording medium having recorded thereon a program for executing the inter-layer video decoding method of claim 1.

12. An inter-layer video decoding apparatus comprising:
- a first layer decoder for reconstructing a first layer image, based on encoding information obtained from a first layer bitstream;
- an illumination compensation determiner for determining, in response to determining that a predetermined partition type of a second layer block is a predetermined type and a prediction mode of a second layer block is not a predetermined prediction mode, obtaining illumination compensation information for the second layer block, from a second layer bitstream; and
- a second layer decoder for decoding the second layer block based on first layer reference block that is from among the reconstructed first layer image and corresponds to the second layer block, and, in response to determining that the illumination compensation information indicates that illumination compensation is performed for the second layer block, generating a reconstructed second layer block compensating illumination of the second layer block.

* * * * *